(12) United States Patent
Wilson et al.

(10) Patent No.: US 9,522,790 B2
(45) Date of Patent: Dec. 20, 2016

(54) ROTARY ORIENTER

(71) Applicant: Morrison Timing Screw Co., Glenwood, IL (US)

(72) Inventors: Nick Wilson, Chicago, IL (US); Ryan Finke, Chicago, IL (US); Mark Burk, Highland, IN (US)

(73) Assignee: MORRISON TIMING SCREW CO., Glenwood, IL (US)

( * ) Notice: Subject to any disclaimer, the term of this patent is extended or adjusted under 35 U.S.C. 154(b) by 0 days.

(21) Appl. No.: 14/491,329

(22) Filed: Sep. 19, 2014

(65) Prior Publication Data

US 2015/0083550 A1  Mar. 26, 2015

Related U.S. Application Data

(60) Provisional application No. 61/880,801, filed on Sep. 20, 2013.

(51) Int. Cl.
*B65G 47/80* (2006.01)
*B65G 29/00* (2006.01)

(52) U.S. Cl.
CPC .............. *B65G 47/80* (2013.01); *B65G 29/00* (2013.01)

(58) Field of Classification Search
None
See application file for complete search history.

(56) References Cited

U.S. PATENT DOCUMENTS

| | | | | |
|---|---|---|---|---|
| 3,934,714 A | * | 1/1976 | Matsumoto | B65G 47/80 198/379 |
| 4,513,852 A | * | 4/1985 | Fegley | B65G 47/244 198/399 |
| 6,345,713 B1 | * | 2/2002 | Ronchi | B65G 29/00 198/377.03 |

FOREIGN PATENT DOCUMENTS

GB    1090620 A  * 11/1967 .............. B23Q 16/00

* cited by examiner

*Primary Examiner* — Kavel Singh
(74) *Attorney, Agent, or Firm* — Quinn Law Group

(57) ABSTRACT

A rotary orienter includes a turret rotatable about a central axis and at least one rotation pad rotatably mounted to the turret and selectively rotatable about a pad axis. The turret rotates to index the rotation pad to a receiving station, a discharge station and at least one actuating station distributed radially about the central axis. The actuating station is intermediate the receiving station and discharge station. The rotation pad indexes from the receiving station in a locked condition such that rotation of the rotation pad is prevented, and is selectively unlocked by the actuating station such that the unlocked rotation pad rotates during indexing of the turret from the actuating station to the discharge station to reorient an object received onto the rotation pad at the receiving station in a received orientation to a predetermined orientation for discharge of the object in the predetermined orientation at the discharge station.

19 Claims, 15 Drawing Sheets

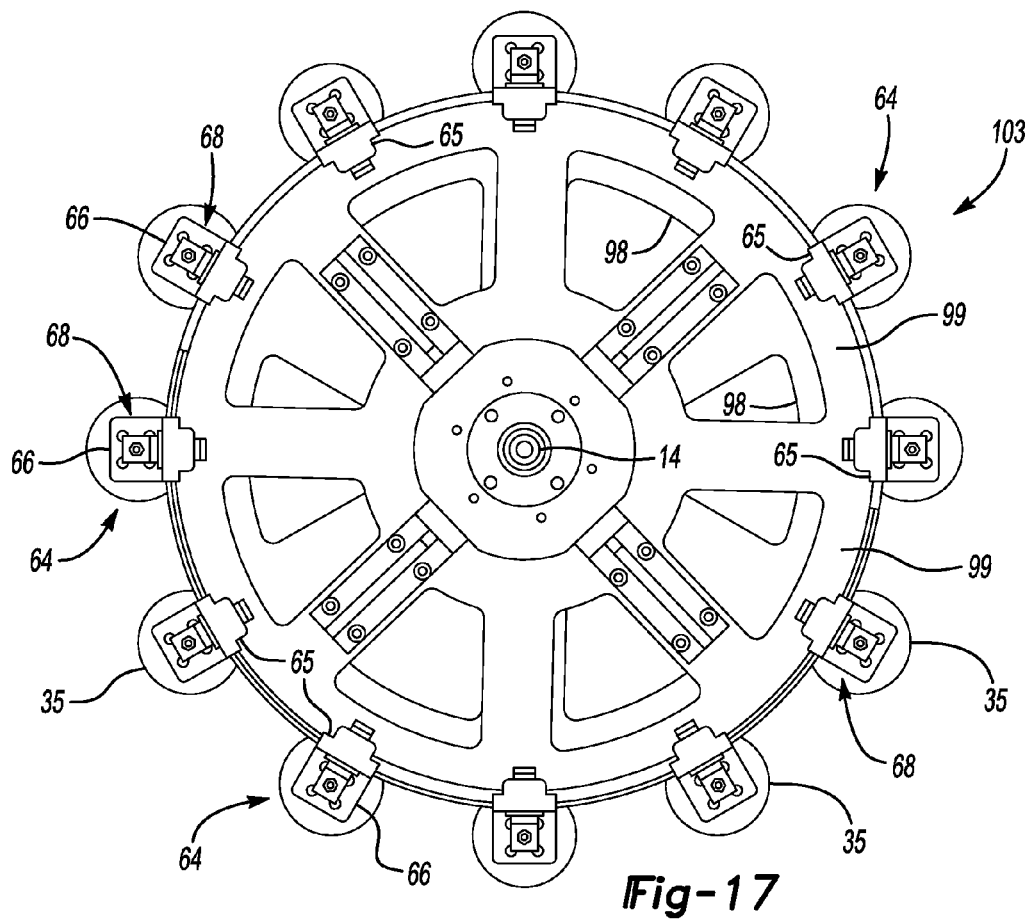
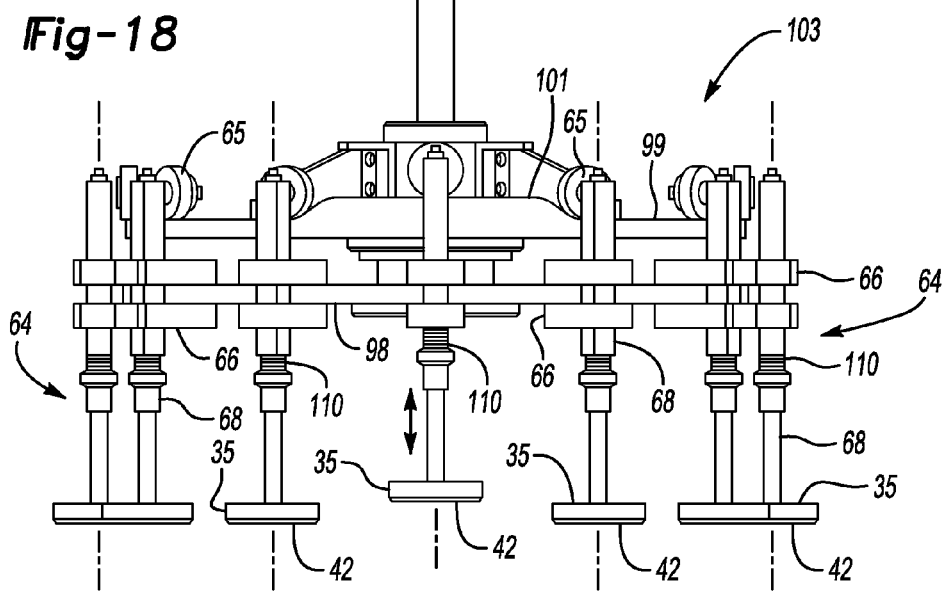

ROTARY ORIENTER

CROSS-REFERENCE TO RELATED APPLICATIONS

This application claims priority to and the benefit of U.S. Provisional Patent Application No. 61/880,801, filed on Sep. 20, 2013, which is hereby incorporated by reference in its entirety.

TECHNICAL FIELD

The present disclosure relates to a rotary orienter for repositioning objects being conveyed on a conveyor system from a random orientation to a predetermined orientation.

BACKGROUND

Orienting systems are used in the packaging industry to reposition an object being conveyed on a conveyor system from a random orientation to a predetermined orientation corresponding to an orienting feature of the object. The orienting feature may be defined by a cross-section of the object such as a relatively shorter or longer side of the object, a functional feature such as a handle, nozzle or spout of the object, a decorative feature such as a recessed or embossed decoration, a label applied to a specific location on the object such as a bar code label or product identification label, etc. The object may be repositioned to a predetermined orientation, for example, to align the orienting feature of the object such that the orienting feature of each object has the same alignment as it is conveyed on the conveyor system for further processing which may include, for example, filling, sealing, collating, bundling, stacking, and/or packaging the oriented objects.

It may be desirable to orient the object to a predetermined orientation to position the object for feeding through a subsequent opening such as a chute, where a misoriented object may jam the opening or chute, or may be subject to handling damage. The object may be oriented to the predetermined orientation to position the object for subsequent packaging, for example, to have a label or seal applied to the object, or to collate the object with other objects to form an object set for bundling, packing and/or wrapping of the object set, where a misoriented object may cause misapplication of a label or seal to the object, misalignment of one object to another in the object set, misapplication of packaging, or visual discontinuity in the packaged set which may affect subsequent processing of the object or customer dissatisfaction, for example, due to an unreadable or misread object bar code or product identifier, misalignment of objects in a packaged set, etc.

SUMMARY

A rotary orienter for orienting an object from a received orientation to a predetermined orientation is provided. The rotary orienter includes a central shaft defining a central axis, a turret rotatably attached to the central shaft and rotatable about the central axis, and at least one rotation pad defining a pad axis and rotatably mounted to the turret such that the rotation pad is selectively rotatable about the pad axis. The turret is rotatable to index the rotation pad to a plurality of index stations including a receiving station, a discharge station, and an actuating station distributed radially about the turret, where the actuating station is intermediate the receiving station and the discharge station. The rotation pad is locked prior to being indexed from the receiving station such that the locked rotation pad is prevented from rotating as it is indexed from the receiving station to subsequent index station.

The actuating station includes an actuator mechanism actuable to selectively unlock the rotation pad to initiate rotation of the rotation pad at the actuating station, such that the unlocked rotation pad is rotatable about the pad axis concurrent with indexing of the turret about the central axis. The turret is rotatable at an indexing rotation rate about the central axis and the rotation pad is rotatable about the pad axis at a pad rotation rate. The rotary orienter is configured such that the pad rotation rate is independently adjustable relative to the indexing rotation rate. In one example, the indexing rotation rate is less than the pad rotation rate.

The rotary orienter further includes a roller guide adjacent the discharge station. A plurality of contact rollers are attached to the rotation pad and are arranged such that contact of the contact rollers with the roller guide as the rotation pad is indexed by the turret into the discharge station prevents rotation of the rotation pad when the rotation pad is position at the discharge station. The plurality of contact rollers includes a first roller and a second roller arranged such that the first roller contacts the roller guide prior to the second roller contacting the roller guide to gradually slow rotation of the rotation pad when the rotation pad is unlocked when indexed to the discharge station.

The rotary orienter further includes a sensor to sense the received orientation of an object received on the rotation pad at the receiving station. The sensor is operable to selectively output an actuating signal to the actuator mechanism to unlock the rotation pad to initiate rotation of the rotation pad at the actuating station when the received orientation of the object is different from a predetermined orientation of the object. The rotation pad, when unlocked in response to the actuating signal, is rotatable at a pad rotation rate such that the object is reoriented from the received orientation to the predetermined orientation by rotation of the rotation pad during indexing of the rotation pad by the turret from the actuating station to the discharge station.

A method of orienting an object using the rotary orienter described herein is provided. The method includes locking the rotation pad at a locking station of the turret such that the rotation pad when locked is not rotatable about the pad axis defined by the rotation pad. The method continues with rotating the turret about the central axis defined by the turret to index the locked rotation pad from the locking station to the receiving station to receive an object in a received orientation on the rotation pad positioned at the receiving station. A sensor senses the received orientation of the object and outputs an actuating signal when the received orientation of the object is different from a predetermined orientation. The outputted actuating signal is received by the actuator mechanism such that when the rotation pad is indexed by the turret to the actuating station, the actuator mechanism is actuated to unlock the rotation pad and initiate rotation of the rotation pad. The rotation pad rotates about the pad axis while the turret concurrently indexes the rotation pad to the discharge station such that the object is reoriented to the predetermined orientation by rotation of the rotation pad and when the rotation pad is indexed to the discharge station. The object is discharged in the predetermined orientation from the rotation pad positioned at the discharge station.

In one example, the method includes gradually stopping rotation of the rotation pad when the rotation pad is unlocked and indexed in contact with a roller guide adjacent the discharge station, by the first contact roller of a roller assembly of the rotation pad contacting the roller guide prior to the second contact roller of the roller assembly contacting the roller guide such that rotation of the rotation pad is slowed and then stopped when both the first and second contact rollers are in contact with the roller guide.

As used herein, the terms "a," "an," "the," "at least one," and "one or more" are interchangeable and indicate that at least one of an item is present. A plurality of such items may be present unless the context clearly indicates otherwise. All numerical values of parameters, quantities, or conditions in this disclosure, including the appended claims, are to be understood as being modified in all instances by the term "about" or "approximately" whether or not "about" or "approximately" actually appears before the numerical value. "About" and "approximately" indicate that the stated numerical value allows some slight imprecision (e.g., with some approach to exactness in the value; reasonably close to the value; nearly; essentially). If the imprecision provided by "about" or "approximately" is not otherwise understood with this meaning, then "about" and "approximately" as used herein indicate at least variations that may arise from methods of measuring and using such parameters. Further, the terminology "substantially" also refers to a slight imprecision of a condition (e.g., with some approach to exactness of the condition; approximately or reasonably close to the condition; nearly; essentially). In addition, disclosed numerical ranges include disclosure of all values and further divided ranges within the entire disclosed range. Each value within a range and the endpoints of a range are all disclosed as separate embodiments. The terms "comprising," "includes," "including," "has," and "having" are inclusive and therefore specify the presence of stated items, but do not preclude the presence of other items. As used in this disclosure, the term "or" includes any and all combinations of one or more of the listed items.

The above features and advantages and other features and advantages of the present disclosure will be readily apparent from the following detailed description of the preferred embodiments and best modes for carrying out the present disclosure when taken in connection with the accompanying drawings and appended claims.

BRIEF DESCRIPTION OF THE DRAWINGS

FIG. 17 is a schematic top view of the hold down mechanism of FIG. 1; and FIG. 18 is a schematic side view of the hold down mechanism of FIG. 17.

DETAILED DESCRIPTION

Figure 1:
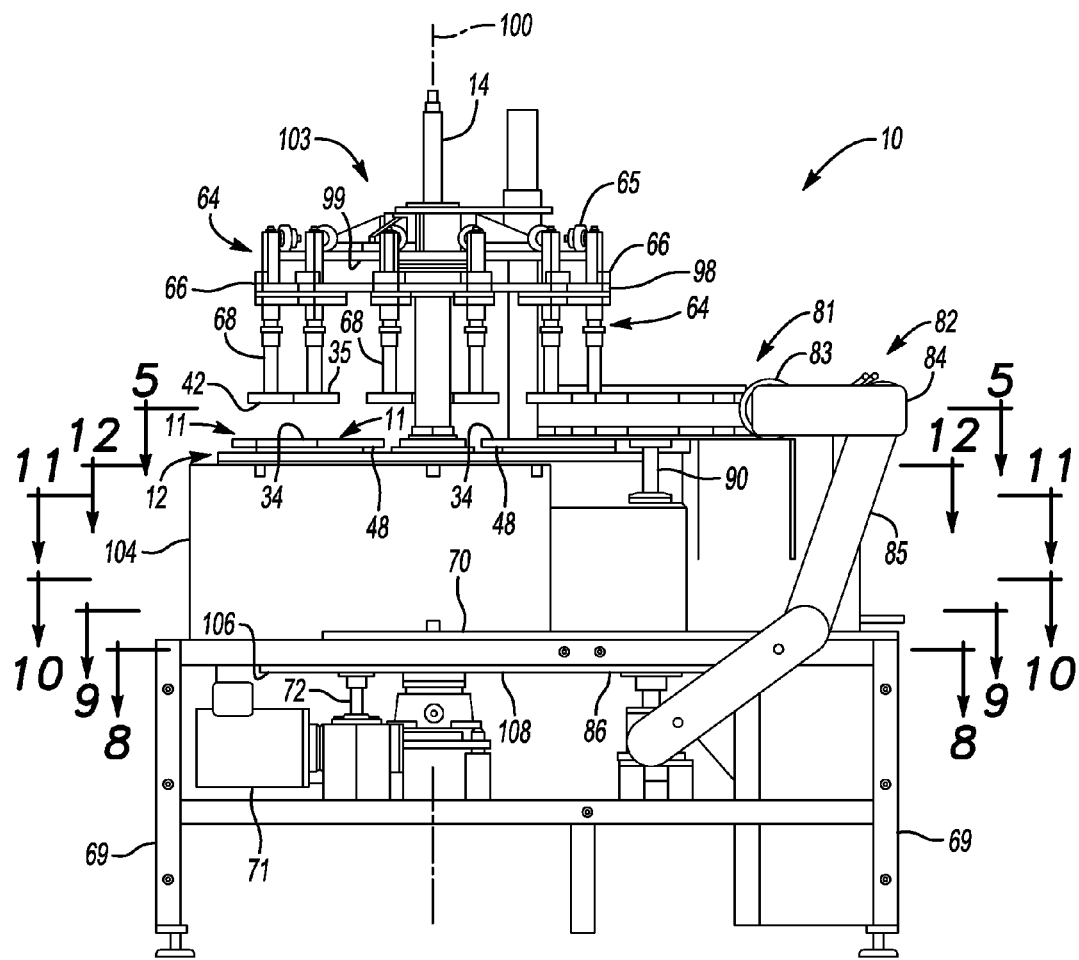
FIG. 1 is a schematic view of a rotary orienter including a hold down mechanism, a turret including a plurality of rotation pads, and a feeding system.

Referring to the drawings wherein like reference numbers represent like components throughout the several figures, the elements shown in FIGS. 1-18 are not necessarily to scale or proportion. Accordingly, the particular dimensions and applications provided in the drawings presented herein are not to be considered limiting.

Figure 3:
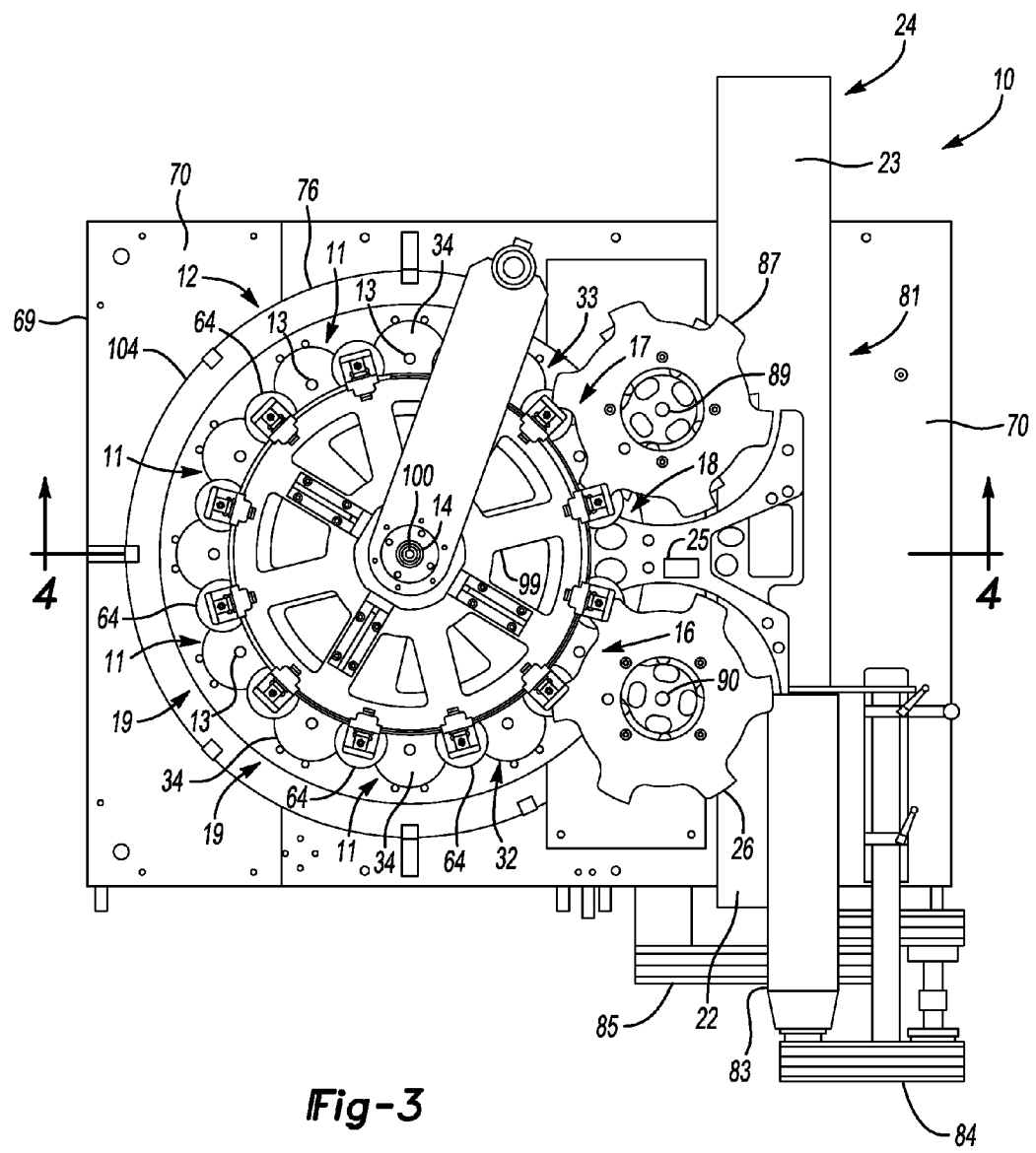
FIG. 3 is a schematic top view of the rotary orienter of FIG. 1 showing the hold down mechanism, the turret including a plurality of rotation pads each in an index position, and the feeding system including an infeed conveyor, a discharge conveyor, a timing screw assembly, an infeed star wheel and a discharge star wheel.

Referring to FIGS. 1 and 3, a rotary orienter is indicated generally at 10, and includes a plurality of rotation pad assemblies 11. A rotation pad assembly 11 may also be referred to herein as a rotation pad 11. The rotation pads 11 are distributed radially on a rotary table 12, also referred to herein as the turret 12, and are rotatably mounted to the turret 12 such that each of the rotation pads 11 is rotatable about a longitudinal pad axis 13 defined by the rotation pad 11. The turret 12 is mounted to a central shaft 14, also referred to herein as a turret shaft 14, such that the turret 12 is rotatable by rotation of the turret shaft 14, and may be indexed by indexing rotation of the turret shaft 14 to index or reposition each rotation pad 11 from a current index station 15 to a subsequent index station 15 distributed radially relative to the turret shaft 14. The turret shaft 14 defines a longitudinal central axis 100, also referred to herein at the turret axis. The plurality of index stations 15 include a receiving station 16, a discharge station 17, and a locking station 18 adjacent to and radially between the receiving and discharge stations 16, 17. The plurality of index stations 15 further includes an entrance station 32 adjacent the receiving station 16, where the rotation pad 11 is indexed from the receiving station 16 to the entrance station 32 by indexing the turret 12 such that contact rollers 44 of the rotation pad 11 are indexed away from contact with an entrance transition segment 93 of a roller guide 31 (see FIG. 11). The plurality of index stations 15 further includes an exit station 33 adjacent the discharge station 17, where the rotation pad 11 is indexed from the exit station 33 to the discharge station 17 such that contact rollers 44 of the rotation pad 11 are indexed in contact with an exit transition segment 92 of the roller guide 31.

Figure 11:
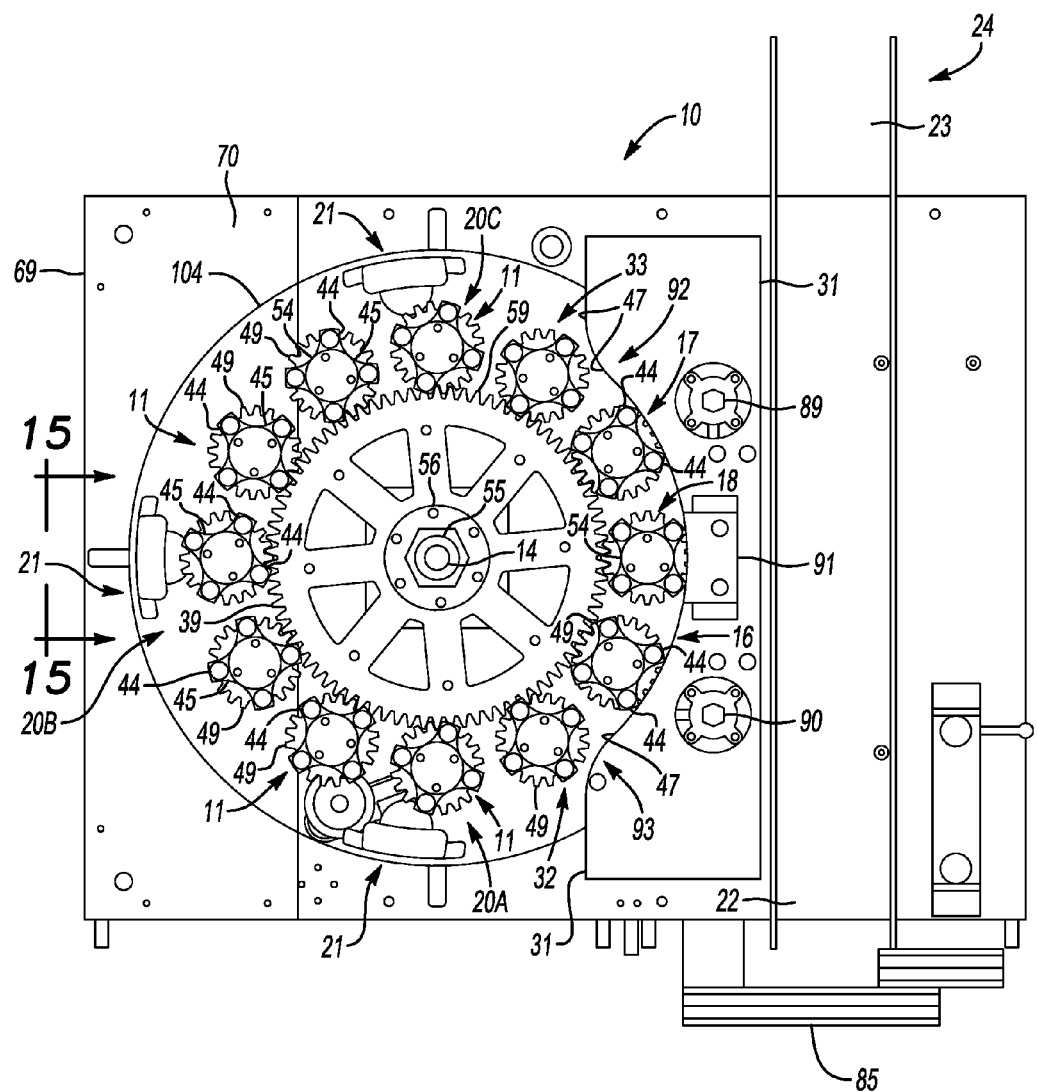
FIG. 11 is a schematic cross-sectional top view of section 11-11 of FIG. 1 including a second sector of the dual sector phaser gear of FIG. 10 rotatably attached to a plurality of pad gears, a plurality of actuating assemblies mounted to the base plate, a gripper locking mechanism and a roller guide.
Figure 12:
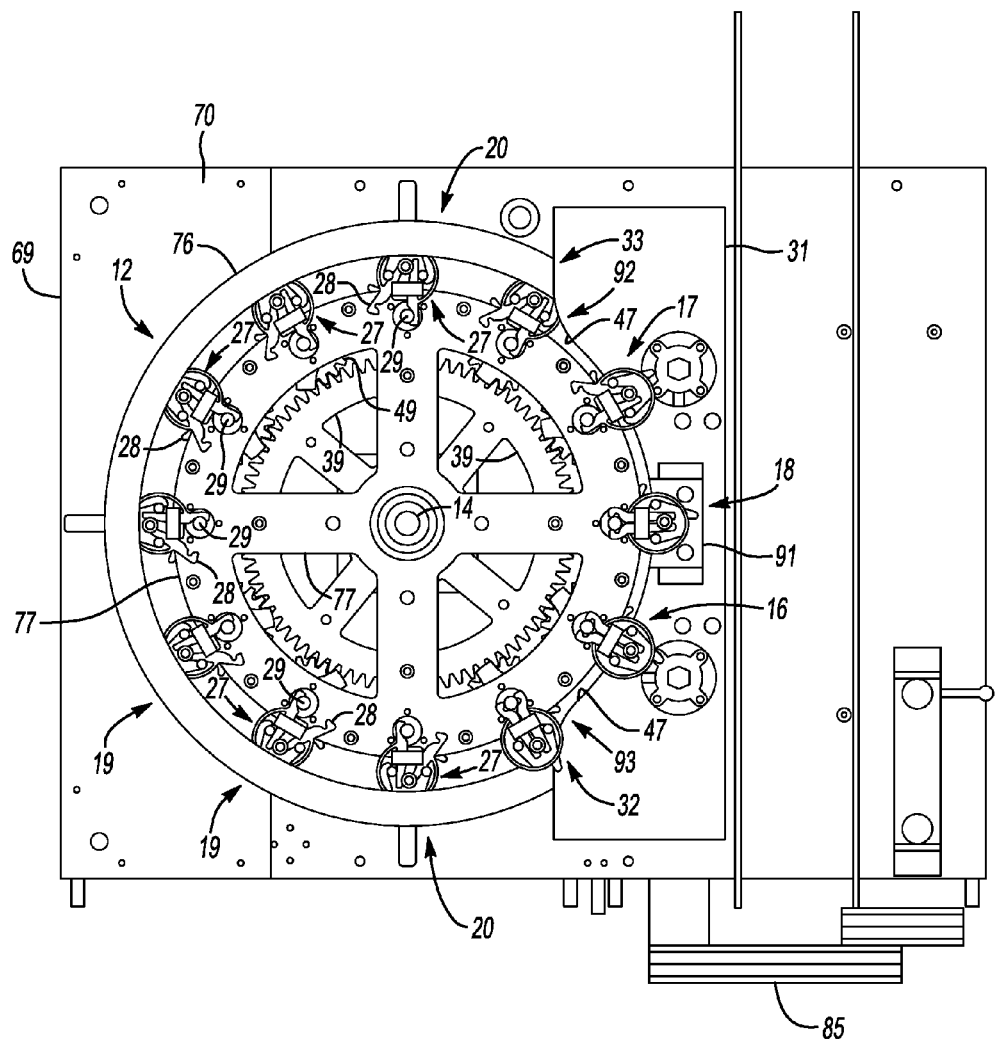
FIG. 12 is a schematic cross-sectional top view of section 12-12 of FIG. 1 including a plurality of catch assemblies mounted to the turret frame in a plurality of index positions, the roller guide, and a gripper locking mechanism.

The index stations 15 include at least one actuating station 20 including an actuator mechanism 21 for selectively actuating a gripper mechanism 27 mounted proximate the rotation pad 11 to release the gripper mechanism 27 from gripping the spindle 29 of the rotation pad 11 to allow rotation of the rotation pad 11 during indexing of the turret 12. The index stations 15 may include one or more intermediate stations 19, for example, between actuating stations 20 and/or between an actuating station 20 and one of the entrance and exit stations 32, 33. In a non-limiting example shown in the drawings, the turret 12 includes twelve rotation pads 11 and is operable to index each rotation pad 11 to each of twelve index stations 15, where an index station 15 is defined as a location on the turret 12 relative to a fixed reference, such as the gripper locking mechanism 91. For example, a rotation pad 11 indexed to align with the gripper locking mechanism 91 is understood to be positioned in the locking station 18. The turret 12 may be indexed to index the subject rotation pad 11 from the locking station 18 to the receiving station 16, to align the subject rotation pad 11 in the receiving station 16 with an infeed star wheel 26, such that the subject rotation pad 11 is positioned in the receiving station 16 adjacent the locking station 18. The turret 12 may be rotated at an indexing rotation rate to index the subject rotation pad 11 from the receiving station 16 to align the subject rotation pad 11 with an entrance transition segment 93 of the roller guide 31, such that the subject rotation pad 11 is positioned in the entrance station 32 adjacent the receiving station 16. As shown in FIG. 11, each actuating station 20 is adjacent an actuator mechanism 21, the discharge station 17 is aligned to a discharge star wheel 87, the receiving station 16 is aligned to the infeed star wheel 26, and the locking station 18 is aligned to the gripper locking mechanism 91. The exit station 33 is aligned to an exit transition segment 92 of the roller guide 31, such that when the subject rotation pad 11 is positioned in the exit station 33 it is adjacent the discharge station 17. It would be understood that turret 12 and rotary orienter 10 may be operable with more or less than twelve index stations 15 and with more or less than twelve rotation pads 11. A turret housing 104 is provided to at least partially enclose the turret, the index stations, and the gearing, for example, to reduce operating noise and/or to prevent access to moving components of the rotary orienter 10 during operation of the rotary orienter 10.

The rotary orienter 10, as described in further detail herein, is configured to orient objects (not shown) received in random orientation from an infeed conveyor 22 (see FIG. 3), by receiving each object individually from the infeed conveyor 22 in a received orientation, positioning the received object in its received orientation on a rotatable rotation pad 11 with the rotation pad 11 positioned at a receiving station 16, orienting the object from the received orientation to a predetermined orientation by rotation of the rotation pad 11 during indexing of the turret 12, and outputting the oriented object from the rotation pad 11 positioned at a discharge station 17 to a discharge conveyor 23 (see FIG. 3) in the predetermined orientation. The infeed and discharge conveyors 22, 23 may be continuous portions of the same feed conveyor 24, as shown in FIG. 3.

The received orientation of each object is sensed by a sensing device 25 (see FIG. 3) proximate the receiving station 16, to determine the received orientation of the object as it is positioned on the rotation pad 11 at the receiving station 16, and from the received orientation, determine the amount of rotation the rotation pad 11 upon which the object is located must be rotated around the pad axis 13 of the rotation pad 11, to reorient the object from the received orientation to the predetermined orientation, where in one example, the amount of pad rotation may be expressed in degrees of rotation about the pad axis 13. The object may define or include an orienting feature. For example, the orienting feature of the object can be defined by a cross-section of the object such as a relatively shorter or longer side of the object, where the cross-section of the object is sensed by the sensor 25. By way of example, the orienting feature of the object can be a functional feature such as a handle, nozzle or spout of the object, a decorative feature such as a recessed or embossed decoration, or a shape feature such as a profile shape detected by the sensor 25. The orienting feature can be a label applied to a specific location on the object such as a bar code label or product identification label and sensed by the sensor 25. The orienting feature can be a measurement taken of a profile, section or area of the object by the sensor 25, where the measurement is determinative of the orientation of the object, etc. The sensing device 25 is operable to sense, measure and/or otherwise quantify the orienting feature to determine the received orientation of the object and/or the amount of pad rotation required to rotate the object from the received orientation to the predetermined orientation. The sensing device 25 can be of any configuration suitable for sensing the orienting feature and/or the received orientation of the object. By way of non-limiting example, the sensing device 25 can include one or more sensors which may include one or more of a contact sensor, a non-contact sensor, an optical sensor, an electrical sensor, a magnetic sensor, a force sensor, a pressure sensor, an audio sensor, etc. The sensing device 25 is operable to sense the received orientation of the object located on the rotation pad 11, and/or is operable to sense an orientation of the object at another location during in infeed sequence, for example, the orientation of the object relative to an infeed member, which in the example shown is the infeed star wheel 26 (see FIG. 3), from which the received orientation of the object on the rotation pad 11 can be determined. In one example, the sensing device 25 includes one or more sensing elements and/or sensors, each sensing element and/or sensor configured to output an orientation signal which may be received and processed by the sensing device 25 to determine the received orientation of the object and/or the required pad rotation to rotate the object from the received orientation to the predetermined orientation.

The sensing device 25 outputs an actuation signal corresponding to the required pad rotation to rotate the object from the received orientation to the predetermined orientation. The actuation signal is received by at least one actuator mechanism 21, where the actuator mechanism 21 is proximate an actuating station 20 and is configured to actuate a gripper mechanism 27 including a gripper 28 to unlock the rotation pad 11, such that when the gripper 28 is released from the spindle 29, the rotation pad 11 is rotatable by the clutch 53. The gripper 28 is actuated from a locked position to an unlocked position in response to the actuation signal. Unlocking the gripper mechanism 27 releases the gripper 28 from a grip face 30 defined by the spindle 29 of the rotation pad 11, such that rotation of the rotation pad 11 is initiated at the time the gripper mechanism 27 is actuated.

The rotary orienter 10 may include one or more actuator assemblies 21, each located adjacent an actuating station 20 as shown on FIG. 11 and positioned radially around the turret 12 as required for the amount of pad rotation required for the configuration of the object being rotated. The actuator assemblies 21 may be positioned as required to achieve the amount of pad rotation required to rotate the object from the received orientation to the predetermined orientation. In an illustrative example shown in FIG. 11, the rotary orienter 10 includes a plurality of actuation stations 20A, 20B, and 20C, arranged such that the actuation station 20A is adjacent to the entrance station 32, the actuation station 20C is adjacent the exit station 33, and the actuation station 20B is intermediate the actuation stations 20A and 20C. In the non-limiting example shown, the intermediate actuation station 20B is positioned equidistant between actuation stations 20A and 20C.

In a first non-limiting illustrative example, objects to be oriented by the rotary orienter 10 each have a first orientation 180 degrees from a second orientation, for example, each orientation corresponding to first and second opposing sides of the object such as opposing sides of an object having a rectangular or oval transverse cross-section. In the illustrative example, the second orientation corresponds to the predetermined orientation of the object. In the received orientation, the object will be in one of the first and second orientations. If the object is received on a respective rotation pad 11 in the second orientation, which corresponds to the predetermined orientation, the object requires no rotation and is conveyed around the turret 12 with the respective rotation pad 11 in the locked position, such that the object is discharged at the discharge station 17 in the predetermined orientation. The sensing device 25 in this instance would sense the object has been received in the predetermined orientation, and as such would not generate an actuation signal, and none of the actuator assemblies 21 would be actuated for that rotation pad 11.

If the object in the received orientation is in the first orientation on a respective rotation pad 11, the object will require rotation of the pad by 180 degrees to rotate the object from the received (first) orientation to the predetermined (second) orientation. In this example, the rotary orienter 10 may include an actuator mechanism 21 at the actuating station 20A to actuate rotation of the respective rotation pad 11. As shown in FIG. 11, the actuating station 20A and the actuator mechanism 21 is positioned adjacent the entrance station 32 and an entrance transition segment 93 of the roller guide 31 (see FIG. 11). As such, when the respective rotation pad 11 is actuated at the actuation station 20A, e.g., the gripper mechanism 27 is released by the actuator mechanism 21 to initiate rotation of the respective rotation pad 11, the respective rotation pad 11 is rotated at a pad rotation rate established by a phaser gear 39 and phaser pulley assembly 41 as described further herein, to rotate the respective rotation pad 11 by 180 degrees about the pad axis 13 during indexing of the turret 12 about the central axis 100 at an indexing rotation rate determined by rotation of a turret gear 108, such that the object is in the predetermined orientation when the respective rotation pad 11 is indexed to the exit station 33 in a stopped (non-rotating) position. At the exit station 33, continued indexing rotation of the turret 12 about the central axis 100 causes contact rollers 44 of the respective rotation pad 11 to make contact with an exit transition segment 92 of the roller guide 31, such that contact of the contact rollers 44 with the roller guide 31 stops pad rotation of the respective rotation pad 11 with the object in the predetermined orientation.

Referring again to FIG. 11, in the present example the single actuating station 20A is most adjacent to, e.g., radially closest to, the entrance station 32. The turret gear 108, motor drive sprocket 106, phaser gear 39 and phaser pulley assembly 41 are configured such that the during indexing rotation of the turret 12 around the central axis 100 by the turret gear 108, the turret 12 indexes at least 180 degrees from the actuation station 20A to the exit transition segment 92 of the roller guide 31, and the respective rotation pad 11 begins a 180 degree pad rotation about its pad axis 13 after being actuated at the actuating station 20A, such that when the respective rotation pad 11 reaches the exit station 33 and contacts the roller guide 31 the object is in the second orientation, e.g., is in the predetermined orientation at the time the rollers 44 of the respective rotation pad 11 contact the roller guide 31 to stop further rotation of the respective rotation pad 11, and such that the object is then retained in the predetermined orientation on the respective rotation pad 11 until discharged at the discharge station 17. The rotary orienter 10 including the turret gear 108 and the phaser drive gear 37, is configured such that the actuated respective rotation pad 11 may be rotated by the phaser drive gear 37 at a pad rotation rate sufficiently slow to prevent jerking, displacement or dislocation of the object relative to the rotation pad 11 surface and/or hold down plate 35 prior to stopping pad rotation of the respective rotation pad 11 by contact of the contact rollers 44 of the respective rotation pad 11 with the roller guide 31. In this illustrative example, the turret 12 is indexed more than 180 degrees from the actuating station 20A to the exit station 33 and the rotation pad is rotated 180 degrees, such that the rotation pad 11 is rotated about its pad axis 13 less than one degree for every degree the turret 12 is indexed about the central axis 100. That is, during the same amount of time the turret 12 takes to index more than 180 degrees about the central axis 100, the respective rotation pad 11 is rotated 180 degrees about its pad shaft 13, such that the indexing rotation rate of the turret 12 is less than the pad rotation rate of the rotation pad 11, to prevent jerking and/or dislocation of the object during reorientation of the object from the as received orientation to the predetermined orientation.

In a second non-limiting example, the objects being oriented by the rotary orienter 10 may each have a first orientation 120 degrees from a second orientation, and a third orientation 120 degrees from the second and first orientations, each orientation corresponding to first, second and third sides of the object, such as the sides of a triangular object. In this illustrative example, the third orientation corresponds to the predetermined orientation of the object. In the received orientation, the object will be in one of the first, second and third orientations. If the objected is received on the respective rotation pad 11 in the third orientation corresponding to the predetermined orientation, the object requires no rotation and the turret 12 is indexed with the respective rotation pad 11 in the locked position, until the respective rotation pad 11 is indexed to the discharge station 17 and the object is discharged from the respective rotation pad 11 in the predetermined orientation. The sensing device 25 in this instance would sense the object has been received in the predetermined orientation, and as such would not generate an actuation signal, and none of the actuator assemblies 21 would be actuated to release the respective rotation pad 11.

Continuing with the example, if the object is received onto the respective rotation pad 11 in a received orientation which is the first orientation, the object will require 240 degrees rotation to rotate the object from the received (first) orientation to the predetermined (third) orientation. In this example, the rotary orienter 10 may include a first actuator mechanism 21 to actuate pad rotation of the respective rotation pad 11, where the first actuator mechanism 21 is positioned at the first actuating station 20A located most adjacent to, e.g., radially closest to, the entrance station 32. The sensor 25 senses the object has been received in the first orientation, and transmits a signal to the actuator mechanism 21 at the actuating station 20. The actuator mechanism 21 at the actuating station 20 receives the signal from the sensor 25 and actuates the gripping mechanism 27 such that the gripper 28 is released from the pad spindle 29 at the actuating station 20 to allow the respective rotation pad 11 to be rotated by the phaser drive gear 37 via the pad gear 49 at a pad rotation rate. In the current example, the phaser drive gear 37 and phaser pulley assembly 41 are configured to drive the respective rotation pad 11 to rotate about its pad axis 13 at a pad rotation rate such that the respective rotation pad 11 is rotated about its pad axis 13 by 240 degrees during indexing of the turret 12 from the first actuating station 20A to the exit station 33 and such that the object is in the predetermined (third) orientation when the respective rotation pad 11 reaches the exit station 33 and makes contact with the roller guide 31. Contact of the contact rollers 44 of the respective rotation pad 11 with the roller guide 31 stops pad rotation of the rotation pad 11, with the object in the predetermined orientation on the rotation pad at the time pad rotation is stopped. In the present example the actuating station 20A may be the station adjacent the entrance station 32 as shown in FIG. 11, or may be the entrance station 32, such that the turret 12 will be indexed at an indexing rotation rate about the central axis 100 approximately 240 degrees after actuation of rotation of the respective rotation pad 11 at the entrance station 32 prior to the respective rotation pad 11 reaching the exit station 33 and contacting the roller guide 31, such that the rotation pad 11 may be rotated at a pad rotation rate which is sufficiently slow to prevent jerking or dislocation of the object relative to the rotation pad 11 surface and/or hold down plate 35. The phaser pulley assembly 41 may be adjusted such that the pad rotation rate of the respective rotation pad 11 established by the phaser gear 39 in this example to achieve the required pad rotation of 240 degrees of the rotation pad 11 during indexing of the rotation pad 11 from the first actuating station 20 (the entrance station 32 in the present example) to the exit station 33 may be different from the pad rotation rate of the rotation pad 11 established by the phaser gear 39 in the previous example. In this illustrative example, the turret 12 is indexed approximately 240 degrees from the actuating station 20A to the exit station 33 and the rotation pad is rotated 240 degrees from the actuating station 20A to the exit station 33, such that the rotation pad 11 is rotated about its pad axis 13 approximately one degree for every degree the turret 12 is indexed about the central shaft 100. That is, during the same amount of time the turret 12 takes to index approximately 240 degrees about the central shaft 100, the respective rotation pad 11 is rotated 240 degrees about its pad shaft 13, such that the indexing rotation rate of the turret 12 in this example is substantially the same as the pad rotation rate of the rotation pad 11, to prevent jerking and/or dislocation of the object during reorientation of the object from the as received orientation to the predetermined orientation.

Continuing with the present example, if the object received onto the respective rotation pad 11 in the received orientation is received in the second orientation, the object will require 120 degrees rotation to rotate the object from the received (second) orientation to the predetermined (third) orientation. In this example, the rotary orienter 10 will include a second actuator mechanism 21 located at a second actuating station 20, where the second actuating station 20 is located radially approximately half way between the first actuating station 20 and the exit station 33 such that the gripper mechanism 27 can be released by the second actuator mechanism 21 to initiate pad rotation of the respective rotation pad 11 at the pad rotation rate established by the phaser gear 39 and the phaser pulley assembly 41 for this second example, to rotate the respective rotation pad 11 by 120 degrees during indexing of the turret 12 from the second actuating station 20 to the exit station 33 such that the object is in the predetermined (third) orientation when the respective rotation pad 11 reaches the exit station 33 and makes contact with the roller guide 31. Contact of the contact rollers 44 of the respective rotation pad 11 with the exit transition segment 92 of the roller guide 31 smoothly stops pad rotation of the respective rotation pad 11 with the object in the predetermined orientation at the time pad rotation is stopped. The second actuator mechanism 21 may be actuated in response to an actuation signal received from the sensing device 25, and generated by the sensing device 25 in response to the sensing device 25 sensing the received position of the object as the second orientation.

In a third non-limiting example, the objects to be oriented by the rotary orienter 10 may have a first orientation 90 degrees from a second orientation, and a third orientation 90 degrees from the second orientation, and a fourth orientation 90 degrees from the third and fourth orientation, each orientation corresponding to first, second, third and fourth sides of the object, such as the sides of a rectangular or oval object. In this example, the fourth orientation corresponds to the predetermined orientation of the object. In the received orientation, the object will be in one of the first, second, third and fourth orientations. In this example, the rotary orienter could be configured to include three actuating stations 20A, 20B, 20C as shown in FIG. 11.

Continuing with the third example, if the object is received onto the respective rotation pad 11 in the fourth orientation, e.g., in the predetermined orientation, the object requires no rotation and is conveyed around the turret 12 with the respective rotation pad 11 in the locked position, such that when the turret 12 is indexed to position the respective rotation pad 11 at the discharge station 17, the object is discharged from the respective rotation pad 11 in the predetermined orientation. The sensing device 25 in this instance would sense the object has been received in fourth orientation, e.g., has been received already in the predetermined orientation, and as such would not generate an actuation signal, and none of the actuator assemblies 21 would be actuated for that rotation pad 11. If the object in the received orientation is in the first orientation, the object will require 270 degrees rotation to rotate the object from the received (first) orientation to the predetermined (fourth) orientation. In this example, the sensor 25 would sense the object has been received in the first orientation, and would transmit a signal to the first actuator mechanism 21 positioned at the first actuating station 20A, which may be located adjacent the entrance station 32 as shown in FIG. 11, or may be the entrance station 32. The actuation station 21 in response to the signal from the sensor 25 would release the gripper 28 of the gripper mechanism 27 from the pad spindle 29 to initiate pad rotation of the respective rotation pad 11 at the actuating station 20A. The respective rotation pad 11 rotates at a pad rotation rate established by a phaser gear 39 and phaser pulley assembly 41 for this example, to rotate the respective rotation pad 11 around its pad axis 13 by 270 degrees during indexing of the turret 12 around its central axis 100 from the actuating station 20A to the exit station 33, such that the object is in the predetermined (fourth) orientation when the respective rotation pad 11 reaches the exit station 33 and its contact rollers 44 make contact with the roller guide 31. Contact of the rollers 44 of the rotation pad 11 with the roller guide 31 at the exit transition segment 92 stops rotation of the respective rotation pad 11, with the object in the predetermined orientation at the time pad rotation is stopped, to allow discharge of the object in the predetermined orientation from the respective rotation pad 11 when the respective rotation pad 11, now stopped from rotation, is indexed to the discharge station 17. In the present example the first actuating station 20A may be adjacent the entrance station 32 as shown in FIG. 11, or may be the entrance station 32, such that the turret 12 will be indexed at least 240 degrees after actuation of rotation of the rotation pad 11 and prior to the rotation pad 11 reaching the exit station 33 and contacting the roller guide 31, and such that the pad rotation rate of the respective rotation pad 11 may be minimized to slowly rotate to prevent jerking or dislocation of the object relative to the rotation pad 11 surface and/or hold down plate 35 while rotating to orient the object from the as received position to the predetermined position. The phaser pulley assembly 41 may be adjustable such that the pad rotation rate of the rotation pad 11 established by the phaser gear 39 in this example can be adjusted to achieve the required rotation of 270 degrees of the rotation pad 11 during indexing of the rotation pad 11 from the first actuating station 20A to the exit station 33, where the pad rotation rate in this example may be different from than the pad rotation rate of the rotation pad 11 established by the phaser gear 39 in the previous two examples where the required rotation of the rotation pad 11 during indexing of the rotation pad 11 from the first actuating station 20 to the exit station 33 was respectively 180 degrees and 240 degrees.

Continuing with the present example, if the object is received onto the respective rotation pad 11 in a received orientation which is the second orientation, the object will require 180 degrees rotation to rotate the object from the received (second) orientation to the predetermined (fourth) orientation. In this example, the rotary orienter 10 will include a second actuator mechanism 21 located at a second actuating station 20B located radially approximately one-third of the way between the first actuating station 20A and the exit station 33 such that the gripper mechanism 27 can be released at the second actuating station 20B by the second actuator mechanism 21 to initiate rotation of the respective rotation pad 11 at the rotation rate established by a phaser gear 39 and phaser pulley assembly 41 for this third example, to rotate the respective rotation pad 11 around the pad axis 13 by 180 degrees during indexing of the turret 12 about the central axis 100 from the second actuating station 20B to the exit station 33, such that the object is in the predetermined (fourth) orientation when the respective rotation pad 11 reaches the exit station 33 and makes contact with the roller guide 31, wherein contact of the rotation pad 11 with the roller guide 31 smoothly stops rotation of the rotation pad 11 with the object in the predetermined orientation. The object is then discharged in the predetermined orientation when the turret 12 indexes to position the respective rotation pad at the discharge station 17. The second actuator mechanism 21 may be actuated in response to an actuation signal received from the sensing device 25, where the actuation signal is generated by the sensing device 25 in response to the sensing device 25 sensing the received position of the object as the second orientation. In this third illustrative example, the turret 12 is indexed approximately 240 degrees from the actuating station 20A to the exit station 33 and the rotation pad is rotated 270 degrees from the actuating station 20A to the exit station 33, such that the rotation pad 11 is rotated about its pad axis 13 slightly more than one degree for every degree the turret 12 is indexed about the central shaft 100. That is, during the same amount of time the turret 12 takes to index approximately 240 degrees about the central shaft 100, the respective rotation pad 11 is rotated 270 degrees about its pad shaft 13, such that in this example the ratio of the pad rotation rate of the rotation pad 11 to the indexing rotation rate of the turret 12 is approximately 1.12:1, to prevent jerking and/or dislocation of the object during reorientation of the object from the as received orientation to the predetermined orientation.

Continuing with this third illustrative example, if the object is received onto a respective rotation pad 11 in a received orientation which is the third orientation, the object will require 90 degrees rotation to rotate the object from the received (third) orientation to the predetermined (fourth) orientation. In this example, the rotary orienter 10 will include a third actuator mechanism 21 located at a third actuating station 20C, where the third actuating station 20C is located radially approximately two-thirds of the way between the first actuating station 20A and the exit station 33 such that the gripper mechanism 27 can be released by the third actuator mechanism 21 to initiate pad rotation of the respective rotation pad 11, with the respective rotation pad 11 rotated at the pad rotation rate established by a phaser gear 39 and phaser pulley assembly 41 for this third example, to rotate the respective rotation pad 11 about its pad axis 13 by 90 degrees during indexing of the turret 12 about the central axis 100 from the third actuating station 20C to the exit station 33, such that the object is in the predetermined (fourth) orientation when the respective rotation pad 11 reaches the exit station 33 and makes contact with the roller guide 31, wherein contact of the rotation pad 11 with the roller guide 31 smoothly stops pad rotation of the rotation pad 11, with the object position on the rotation pad 11 in the predetermined orientation at the time pad rotation is stopped. The third actuator mechanism 21 may be actuated in response to an actuation signal received from the sensing device 25, and generated by the sensing device 25 in response to the sensing device 25 sensing the received position of the object as the third orientation.

The examples provided herein are non-limiting, and it would be understood that each of the index stations 15 other than the receiving, locking, and discharge stations 16, 18, 17 may be configured as an actuating station 20 such that pad rotation of the rotation pad 11 about its pad axis 13 could be actuated at each of these stations to provide varying degrees of pad rotation of a respective rotation pad 11 between an actuating station 20 and the exit station 33 during conveyance of the object on the respective rotation pad 11 from one station to the next by indexing of the turret 12 about the central axis 100, and such that the pad rotation rate can be minimized to prevent jerking or dislocation of the object on the pad surface 34 of the rotation pad 11 during indexing of the turret 12 and rotation pads 11.

Because the pad rotation speed of the rotation pad 11 can be varied by adjustment of the phaser pulley assembly 41, as described further herein, the pad rotation speed can be adjusted to the minimum pad rotation speed required to achieve the maximum pad rotation required by the respective rotation pad 11 between the first actuating station 20 and the exit station 33, for the specific shape and/or configuration of the object being oriented. By adjusting the pad rotation speed to the minimum rotation speed, the object positioned on the pad surface 34 of the rotation pad 11 is slowly rotated with rotation of the rotation pad 11 to prevent and/or minimize jerking, slipping, or dislocation of the object relative to the pad surface 34 of the rotation pad 11 and/or the plate surface 42 of the hold down plate 35 during pad rotation of the rotation pad 11 and indexing of the rotation pad 11 from station to station during indexing of the turret 12 at an indexing rotation rate.

Figure 5:
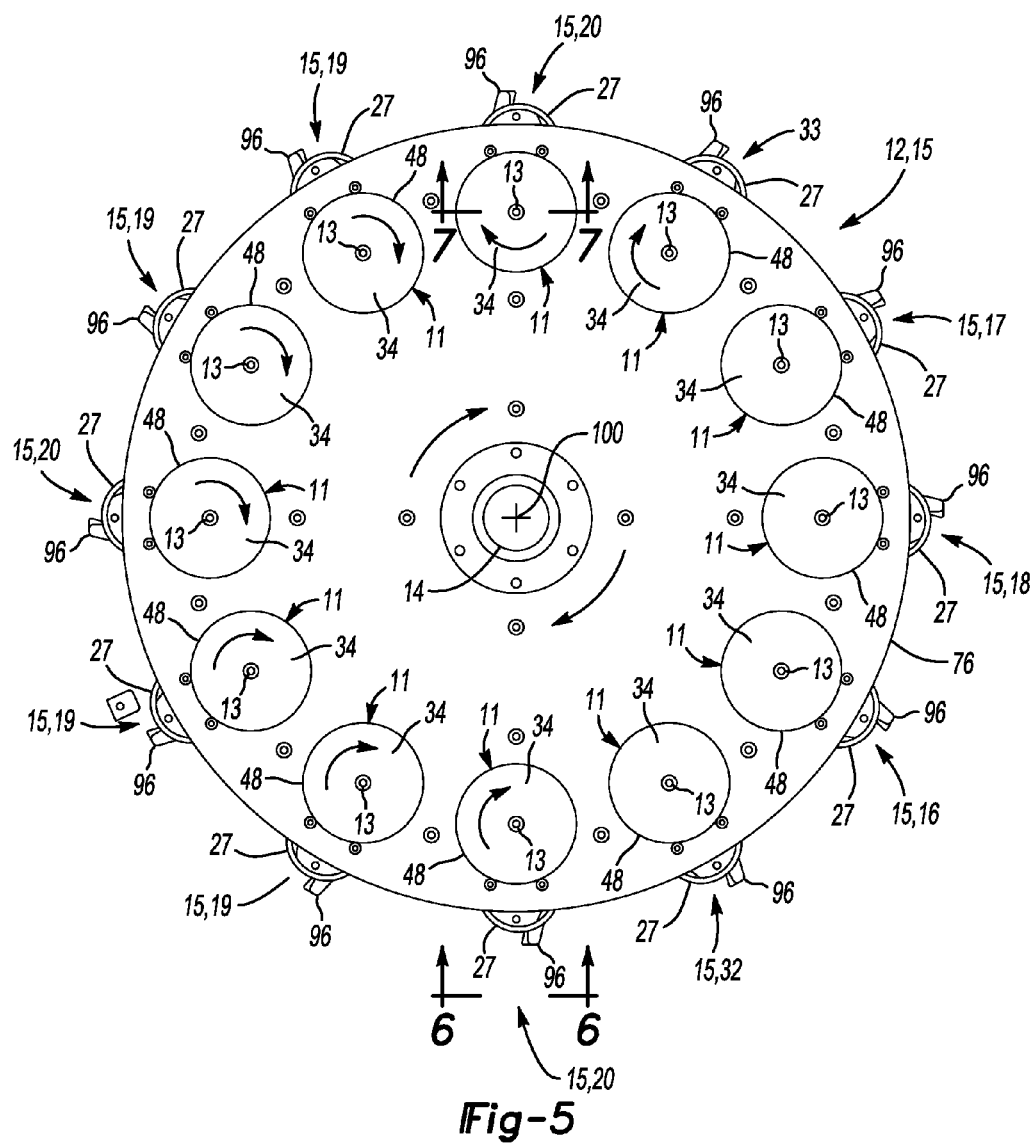
FIG. 5 is a schematic top view of section 5-5 of FIG. 1 with the base frame and conveyor removed from the drawing for ease of illustration, showing the plurality of rotation pads rotatably attached to the turret with each rotation pad in an index position and a plurality of catch assemblies attached to the turret adjacent each rotation pad.
Figure 6:
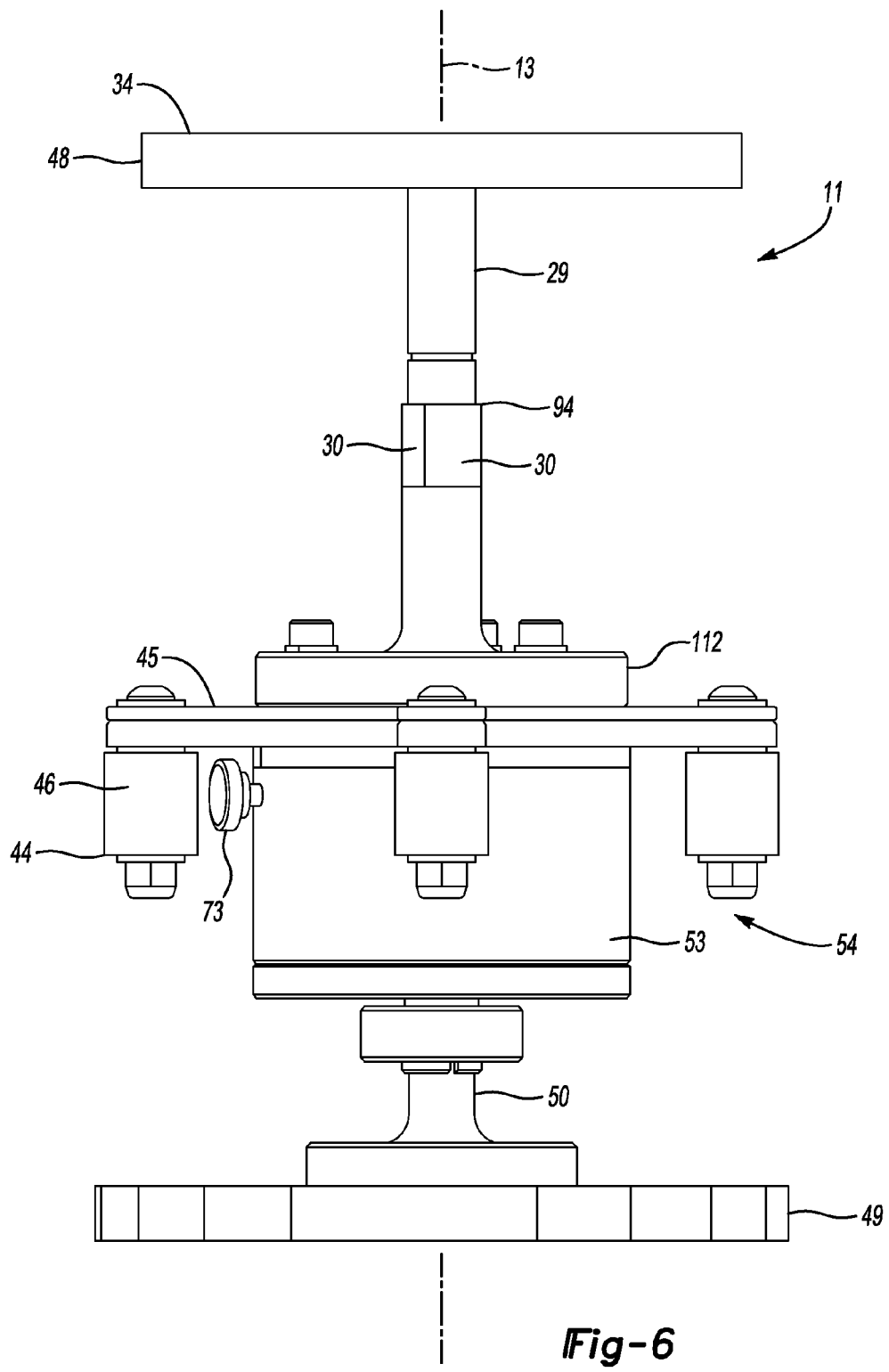
FIG. 6 is a schematic side view of section 6-6 of FIG. 5 of a rotation pad of the rotary orienter with the turret and gripper mechanism removed from the drawing for ease of illustration, the rotation pad including a pad element attached to a spindle, a spindle segment including a plurality of grip faces, a roller frame assembly, a clutch assembly and a pad gear.

Rotation of the rotation pad 11 is stopped at the exit station 33 gradually, beginning with indexing of the rotation pad 11 toward the exit station 33 by indexing rotation of the turret 12 and initial contact by one of the contact rollers 44 of the roller assembly 43 of the rotation pad 11 with an exit transition segment 93 of the roller guide 31, followed by contact of a second contact roller 44 of the roller assembly 42. Contact of two adjacent contact rollers 44 with the roller guide interface 47 of the exit transition segment 93 of the roller guide 31 prevents further pad rotation of the rotation pad 11, such that pad rotation is gradually stopped prior to the rotation pad being indexed from the exit station 33 to the discharge station 17. Each rotation pad 11 includes a roller assembly 43, as shown in FIG. 6, each roller assembly 43 including a plurality of rollers 44 rotatably attached to a roller frame 45, such that each roller 44 is freely rotating about the roller 44 axis. Referring to FIGS. 5 and 11, the turret 12 indexes clockwise about the central axis 100 such that as each rotation pad 11 is indexed to enter the exit station 33, the roller surface 46 of a first roller 44 on the roller frame 45 makes contact with the roller guide interface 47 followed by the roller surface 46 of a second roller 44 adjacent the first roller 44 making contact with the roller guide interface 47. The two rollers 44 in contact with the roller guide interface 47 prevent further rotation of the rotation pad 11 about its pad axis 13 during indexing of the rotation pad 11 to the discharge station 17 by the turret 12 and during discharge of the object from the rotation pad 11 at the discharge station 17.

The contact rollers 44 remain in contact with the roller guide interface 47 of the roller guide 31 as the turret 12 continues to index the rotation pad 11 to the locking station 18. At the locking station 18, a gripper locking mechanism 91 adjacent the locking station 18 relocks the gripper mechanism 27 to prevent rotation of the rotation pad 11 about its axis 13. Relocking the gripper mechanism 27 includes rotating a locking element 97 (see FIG. 13) of the gripper mechanism 27 such that the gripper arms 109 close on the spindle element 94 of the spindle 29 of the rotation pad 11, and exert a gripping force FG (see FIG. 7.) sufficient to overcome a clutch force FC, as further described herein. Gradually stopping rotation of the rotation pad 11 by gradual contact of a first contact roller 44 and then a second roller 44 with the roller guide 31 provides a gradual and smooth slowing and stopping event, thereby preventing and/or minimizing jerking, slipping, or dislocation of the object relative to the pad surface 34 of the rotation pad 11 and/or the plate surface 42 of the hold down plate 35 during stopping of rotation pad 11 rotation. The smooth gradual stopping event provided by first and second contact rollers 44 of the roller assembly 43 gradually contacting the roller guide 31 is advantaged as compared with, for example, the application of a discrete braking force directly to one or more of the rotation pad 11, the spindle 29, the pad gear shaft 50, the pad gear 49, or the pad element 48.

Figure 7:
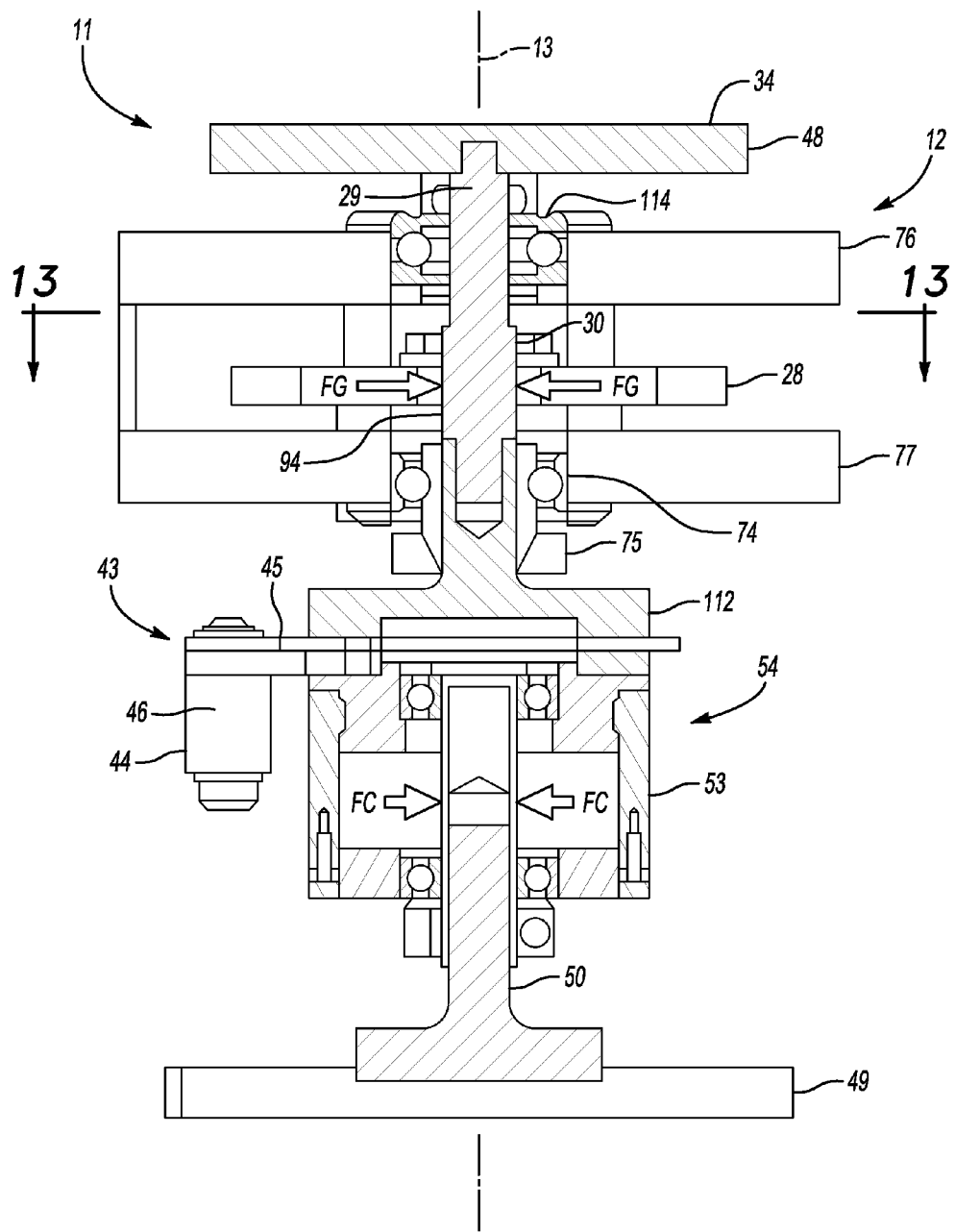
FIG. 7 is a schematic cross-sectional side view of section 7-7 of the rotation pad of FIG. 5 installed in the turret and including the gripper mechanism.
Figure 13:
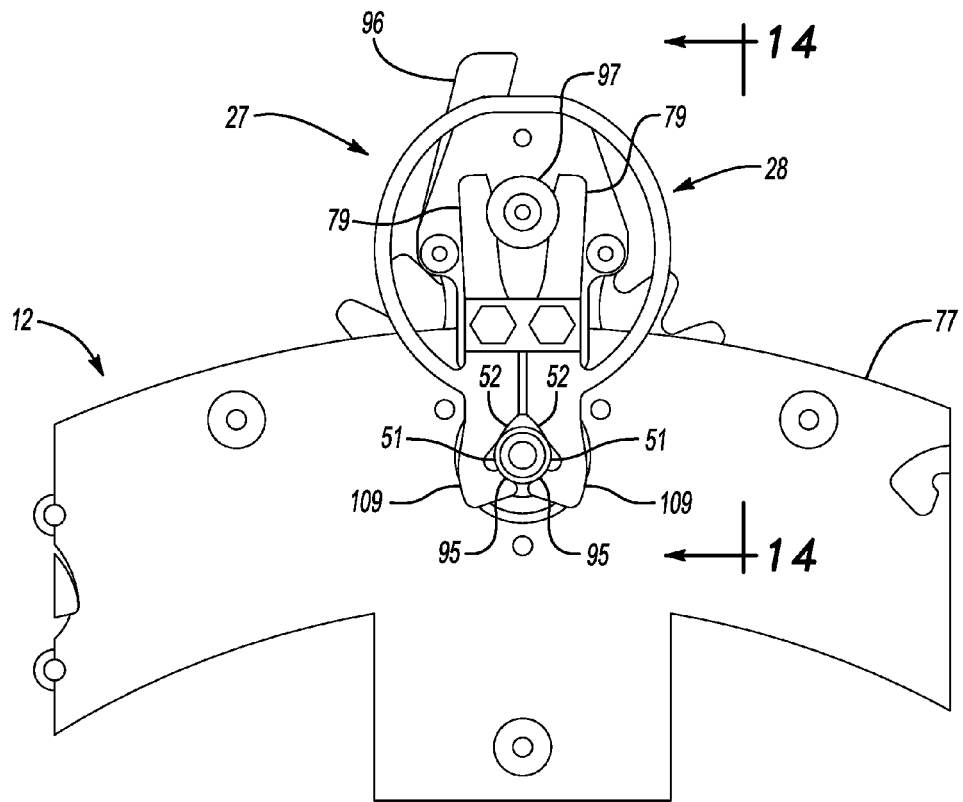
FIG. 13 is a schematic cross-sectional partial side view of section 13-13 of FIG. 7 including the gripper mechanism mounted to the turret frame in an index position.

Referring to FIGS. 6-7 and 13-16, the gripper mechanism 27 is configured to initiate rotation of the rotation pad 11 by releasing a gripper 28 from a spindle element 94, where the gripper 28 defines a gripping interface 51 which, when in selective contact with one or more grip faces 30 defined by the spindle element 94, prevents rotation of the rotation pad 11 by exerting a gripping force FG in opposition to a clutch force FC, as shown in FIG. 7. The spindle element 94 in the example shown in FIGS. 6, and 13 defines a generally square transverse cross-section and four rectangular grip faces 30. The gripping interface 51 defined by the gripper arms 109 in the locked position shown in FIG. 13 is irregular to the grip faces 30 of the spindle element 94. In the example shown, the gripping interface 51 is contoured, and includes curved interface portions 52 and flat interface portions 95, as shown in FIG. 13, such that during a gripping event, the gripping interface 51 initially makes line contact with the spindle element 94 and then seats the grip faces 30 against the flat interface portions 95 of the gripper arms 109. By initially making line contact between the gripping interface 51 and the spindle element 94, then receiving the grip faces 30 into the flat interface portions 95 of the gripping interface 51, the gripping force FG is increased gradually on the spindle element 94 to provide a smoother gripping event, e.g., a smoother locking event to prevent rotation of the rotation pad, as compared to a locking event initiated, for example, by inserting a pawl into a detent. The gripper 28 is configured for quick release such that when the locking lever 96 is contacted by the actuating element 80 of the actuator mechanism 21, the gripper arms 109 spring back to concurrently release all grip faces 30 from contact with the gripping interface 51, such that there is no drag or interference with initiation of rotation of the rotation pad 11 during release of the gripper mechanism 27. For example, the gripper mechanism 27 and/or gripper 28 may be configured as disclosed in U.S. patent application Ser. No. 13/679,189 filed Nov. 16, 2012 by the inventor.

Referring to FIGS. 6 and 7, the clutch assembly 54 operating on the spindle 29 of the rotation pad 11 is, in the example provided herein, an adjustable clutch 53, which may be an adjustable magnetic clutch 53, such that the clutch force FC (see FIG. 7) exerted by the clutch 53 on the spindle 29 can be balanced and/or adjusted to the gripping force FG exerted by the gripper 28 on the spindle element 94, to smooth initiation of pad rotation upon release of the gripping force FG. The clutch force FC and gripping force FG can be balanced by adjustment of the clutch 53 using the clutch adjustment 73, such that the events of releasing the spindle to initiate of rotation of the rotation pad 11 from a locked condition and gripping the spindle 29 to prevent rotation of the rotation pad 11 each occur smoothly with negligible or no jerking, slipping, or dislocation of the object relative to the pad surface 34 of the rotation pad 11 and/or the plate surface 42 of the hold down plate 35.

Figure 8:
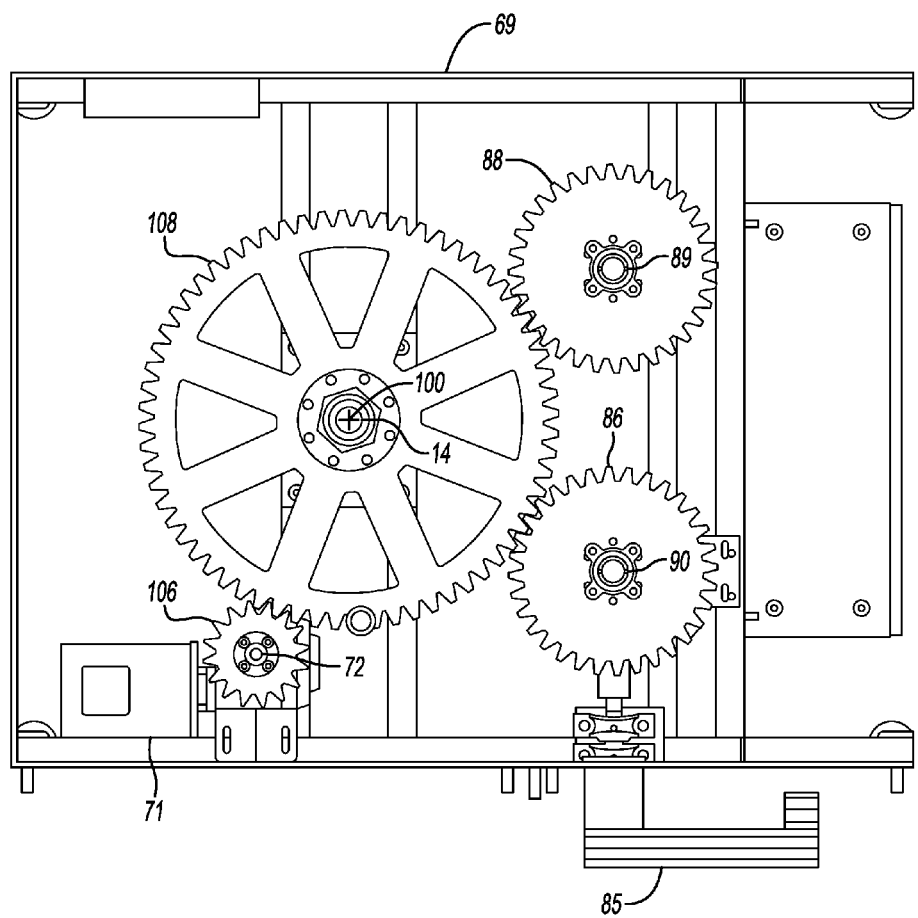
FIG. 8 is a schematic top view of section 8-8 of FIG. 1 including the turret gear, motor drive sprocket, and discharge and infeed star wheel gears.
Figure 9:
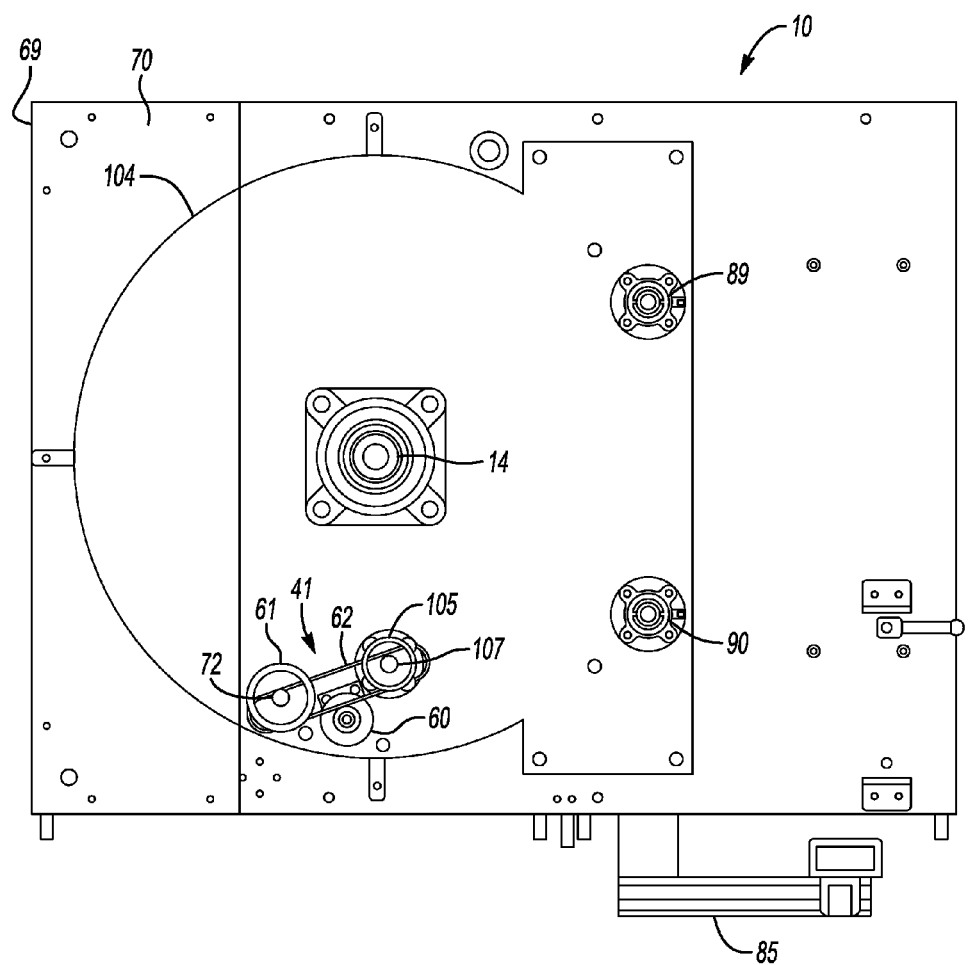
FIG. 9 is a schematic cross-sectional top view of section 9-9 of FIG. 1 including the phaser pulley assembly mounted above the base plate.
Figure 10:
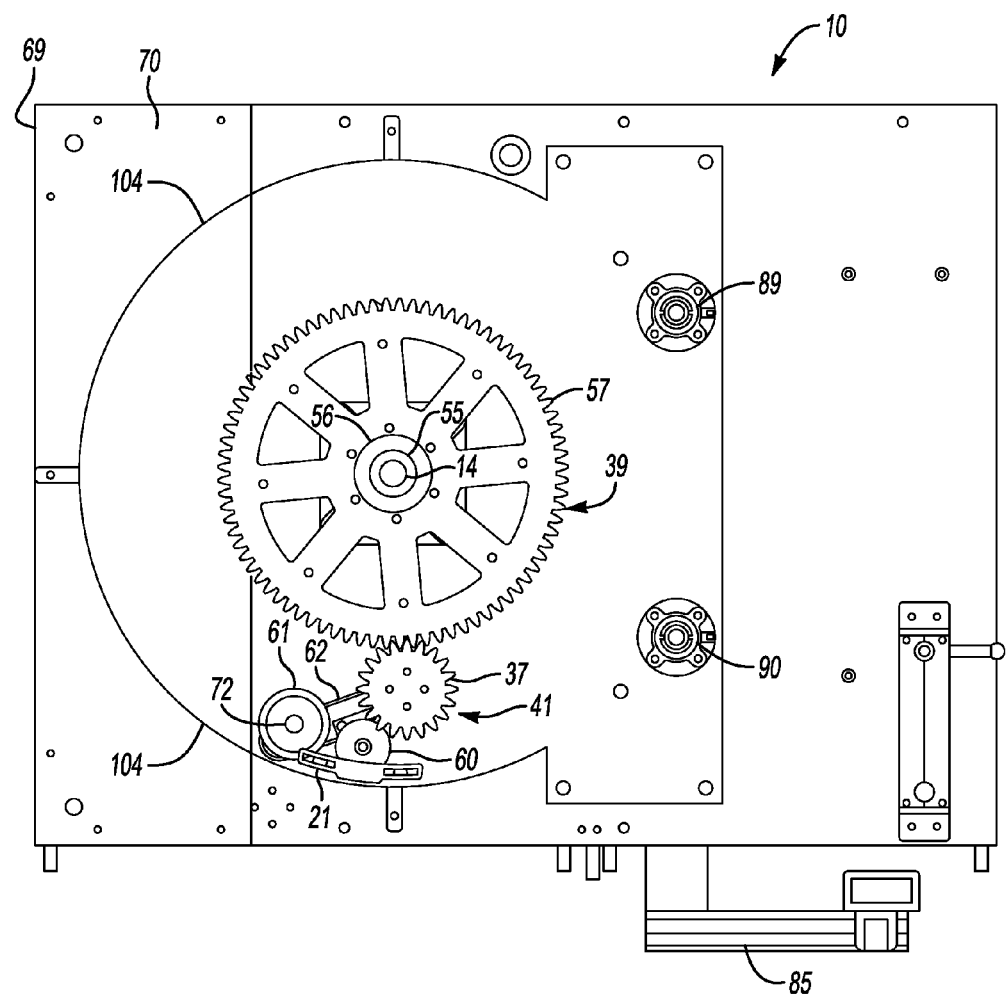
FIG. 10 is a schematic cross-sectional top view of section 10-10 of FIG. 1 including a first sector of a dual sector phaser gear rotatably attached to a phaser drive gear driven by a phaser pulley assembly.

As will be described in further detail, each rotation pad 11 includes a pad gear 49 which is rotatable by a phaser gear 39 at a pad rotation rate. The phaser gear 39, which is a dual sector gear including a first (lower) sector gear 57 and an second (upper) sector gear 59, is mounted to the turret shaft 14 via a phaser gear hub 56 and phaser gear bushing 55, such that the phaser gear 39 is freely rotatable relative to the turret shaft 14, e.g., such that the phaser gear 39 is not rotated by the indexing rotation of the turret shaft 14, and such that the pad rotation rate and/or rotation speed of the phaser gear 39 is independent of the indexing rotation rate of the turret shaft 14 and the turret gear 108. As shown in FIGS. 9 and 10, the phaser gear 39 is driven by a phaser drive gear 37 including a phaser drive gear shaft 107 which is rotatably attached by a phaser pulley assembly 41. The phaser pulley assembly 41 includes a phaser gear 39 driven by a pulley belt 62 attaching the phaser gear pulley 105 to an idler pulley 60 and a motor sprocket pulley 61. The motor sprocket pulley 61 includes a motor drive shaft 72 which is attached to the motor drive sprocket 106 shown in FIG. 8 and driven by the motor 71. As such, the rotation speed of the phaser gear 39 is determined by the speed of rotation of the motor drive sprocket 106 and the configuration of the phaser pulley assembly 41, such that the pad rotation rate is independent of the indexing rotation rate of the turret 12, where indexing rotation of the turret 12 is separately driven by the motor 71 via the motor drive sprocket 106 and turret gear 108. Because the pad rotation rate of the rotation pads 11 about their respective pad axis 13 and the rotation speed of the phaser gear 39 driving the pad gears 49 is adjustable independently of the indexing rotation rate of the turret 12 about the central axis and the rotation speed of the turret shaft 14, the pad rotation speed of the rotation pads 11 can be adjusted to the minimum pad rotation speed allowable to achieve the maximum degrees of rotation required to rotate the object on the rotation pad 11 from a received orientation to the predetermined orientation during indexing of the turret 12 about the central axis 100 from the entrance station 32 to the exit station 33 at a indexing rotation rate. Minimizing the pad rotation speed, as described previously, prevents and/or minimizes jerking, slipping and/or dislocation of the object relative to the pad surface 34.

Further, because the pad rotation rate of the rotation pads 11 can be minimized, a hold down force exerted by the hold down plate 35 on the object to retain the object between the hold down plate 35 and the pad element 48 during rotation of the rotation pad 11 and the object thereon can be minimized. In the example described herein and shown in FIGS. 1, 17 and 18, the hold down mechanism 103 includes a plurality of spring loaded hold down members 64, where each hold down member 64 is operatively mounted to a carrier plate 98. The carrier plate 98 is rotatably mounted to the turret shaft 14. The hold down members 64 are distributed on the carrier plate 98 and aligned to the turret 12 such that each of the hold down members 64 is aligned with a respective rotation pad 11, each hold down plate 35 aligns with a respective pad element 48, and the member axis 63 of each hold down member 64 aligns with the respective pad axis 13 of a respective one of the rotation pads 11. The carrier plate 98 and turret 12 are concurrently rotated by the turret shaft 14 at the indexing rotation rate, such that each respective hold down member 64 remains aligned with a respective rotation pad 11 during indexing of the turret 12 at the indexing rotation rate from one index station 15 to another. Because the pad rotation rate of the rotation pads 11 can be minimized by adjustment of the phaser pulley assembly 41, and smooth stopping and starting of rotation of the rotation pad 11 is realized by the roller assembly 43 interfacing with the roller guide 31 and the configuration of the gripper mechanism 27, the hold down force required to restrain the object between the hold down plate 35 and the pad element 48, to prevent slippage or dislocation of the object relative to the plate surface 42 of the hold down plate 35, is minimal. As such, spring loading of the hold down arm 68 by a spring element 110 provides sufficient hold down force and no additional mechanism is required to maintain alignment between the hold down member 64 and the rotation pad 11 and/or to exert incremental hold down force to prevent object dislocation during pad rotation initiation, pad rotation, pad rotation stop, and pad indexing events.

As shown in FIG. 18, the hold down mechanism 103 includes a cam plate 99 defining a cam element 101. The cam plate 99 is mounted on the turret shaft 14 and retained in position relative to the receiving and discharge stations 16, 17 such that cam element 101 is aligned to the receiving and discharge stations 16, 17 and does not rotate with indexing rotation of the turret shaft 14. Each hold down member 64 is affixed to the carrier plate 98 via a carrier bracket 66 and each includes a follower element 65 in rolling contact with the cam plate 99. A hold down arm 68, to which the hold down plate 35 is affixed, is moveable in the carrier bracket 66 relative to the member axis 63 such that during indexing rotation of the carrier plate 98 the follower element 65 travels along the cam element 101 to lift and lower the hold down plate 35. The cam plate 99 is aligned to the receiving and discharge stations 16, 17 such that the follower travels along the cam element 101 to lift the hold down arm 68 and plate aligned with a respective rotation pad 11 prior to discharge of an object retained by the hold down member 64 from the rotation pad 11 by a discharge member, which in the example shown is the discharge star wheel 87. The cam element 101 is configured to maintain the hold down arm 68 in a lifted position while the turret 12 and hold down mechanism 103 are indexed from the discharge station 17 to the receiving station 16, such that the hold down arm 68 is lifted while receiving an object on the rotation pad 11 at the receiving station 16, and to lower the hold down arm 68 and plate prior to the rotation pad 11 indexing from the exit station 33, such that the hold down plate 35 is lowered and exerting a retaining force on the object against the pad element 48 before the rollers 44 of the rotation pad 11 fully disengage from the roller guide 31. As such, the hold down arm 68 and plate are fully engaged in the lowered position and the object is stable and retained between the hold down plate 35 and the pad element 48 in the as received orientation, and while the rotation pad 11 is in a locked position and further restrained from movement by the rollers 44 in contact with the roller guide 31. Dislocation from the as received orientation by the application of the hold down plate 35 to the object is thereby minimized, such that any repositioning error attributable to dislocation from the received orientation sensed by the sensing device 25 is eliminated. The sensing device 25 may be positioned such that the as received orientation is sensed and determined after the hold down plate 35 is in contact with the object, to eliminate dislocation error in the as received orientation sensed by the sensing device 25.

Figure 2:
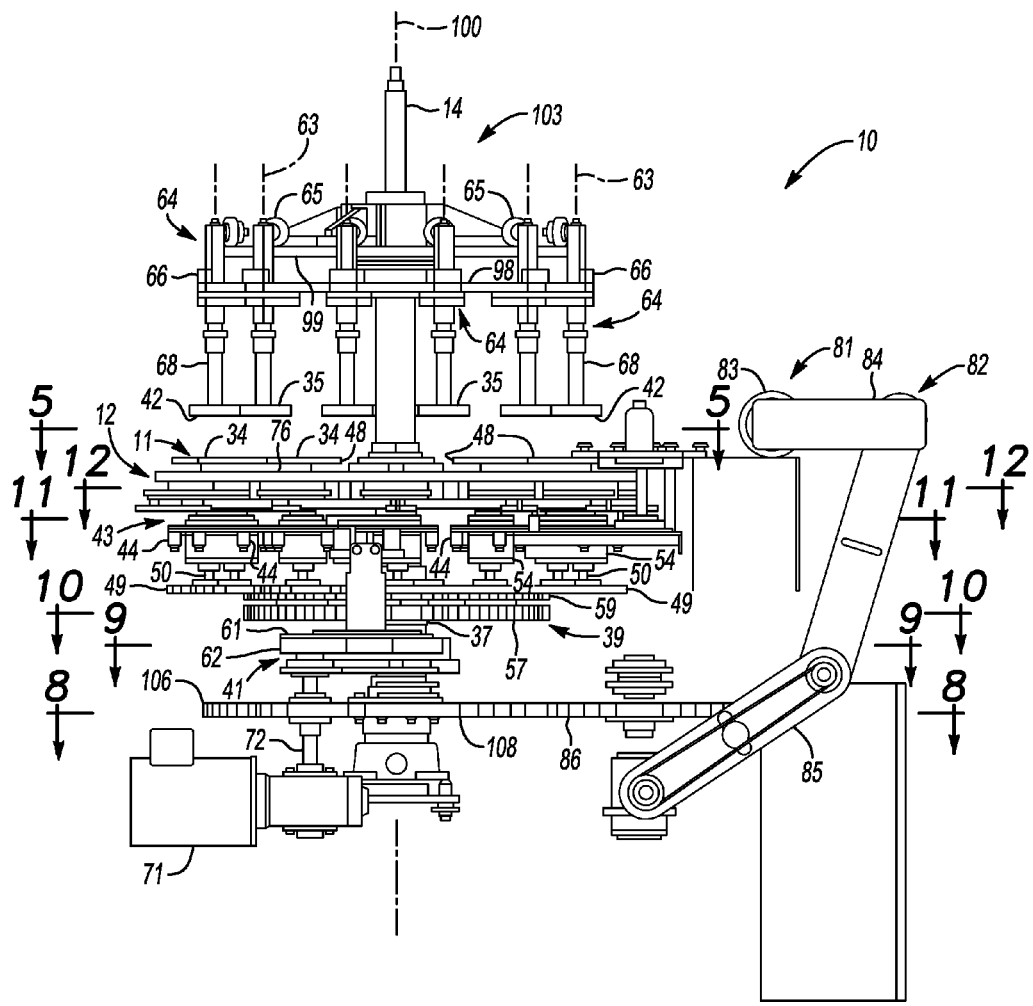
FIG. 2 is a schematic side view of the rotary orienter of FIG. 1 with the turret housing and motor frame removed from the drawing for ease of illustration.
Figure 4:
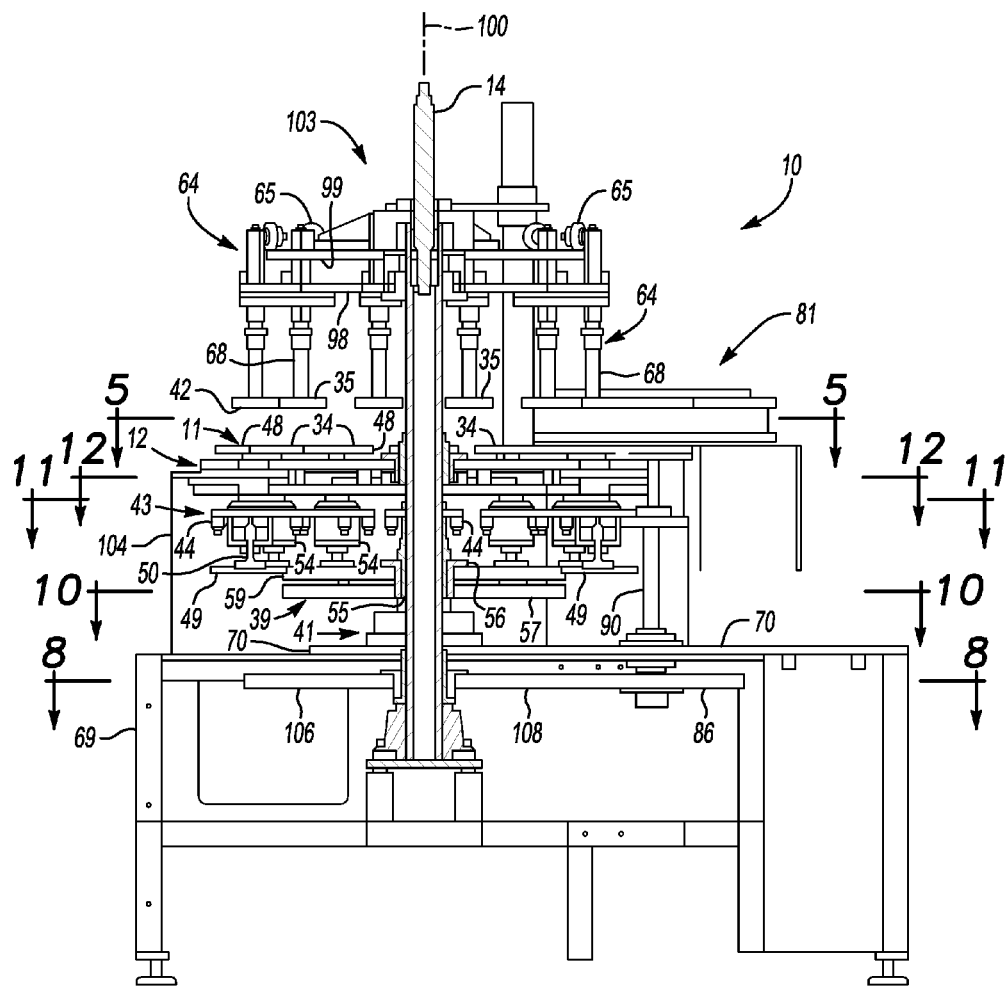
FIG. 4 is a schematic cross-sectional side view of section 4-4 of the rotary orienter of FIG. 3.

Referring again to FIGS. 1-18, a description of the rotary orienter follows. FIGS. 1, 2 and 4 show the rotary orienter mounted to a base frame 69 including a base plate 70. A motor 71 is mounted to the base frame 69 and is configured to output a drive force to a motor drive shaft 72. The motor drive shaft 72 is attached to a motor drive sprocket 106 and to the sprocket pulley of the phaser pulley assembly 41, as shown in FIG. 2. As shown in FIG. 8, the motor drive sprocket 106 is engaged with the turret gear 108 to rotate, e.g., index, the turret gear 108 and the turret shaft 14 attached to the turret gear 108 at the indexing rotation rate. The turret shaft 14 rotates the turret 12, also referred to as the rotary table 12, to index the turret 12 from one index position to the next. Referring to FIG. 5, the turret 12 is rotated by the turret shaft 14 in a counter clockwise direction when viewing the turret 12 table from a top view as shown in the drawing. The turret gear 108 and/or turret shaft 14 also rotates the carrier plate 98 of the hold down mechanism 103 to index the carrier plate 98 from one index position to the next, as previously described. The turret gear 108 is engaged with an infeed star wheel gear 86 and with a discharge star wheel gear 88, such that, respectively, the infeed star wheel 26 and the discharge star wheel 87 are rotated at a wheel rotation rate in direct relationship to the indexing rotation rate of the turret gear 108 and the turret 12.

The motor drive shaft 72 is connected to and drives a sprocket pulley of the phaser pulley assembly 41, as shown in FIG. 2. Referring to FIGS. 2, 4, 9 and 10, the phaser pulley assembly 41 includes a pulley belt 62 attached to the sprocket pulley, an idler pulley 60, and a phaser gear pulley 105. The phaser pulley assembly 41 including the phaser gear pulley 105 is adjustable, to adjust the rotation speed of a phaser drive gear shaft 107 rotatably attached to the phaser gear pulley 105. The phaser drive gear shaft 107 is rotatably attached to a phaser drive gear 37 shown in FIG. 10, which is driven by phaser drive gear shaft 107 at a rotation speed determined by the configuration of the phaser pulley assembly 41, where the rotation speed of the phaser drive gear shaft 107 is adjustable by adjustment of the phaser pulley assembly 41. As shown in FIG. 10, the phaser drive gear 37 is engaged with the phaser gear 39. The phaser gear 39 may be configured as shown in the drawings, as a dual sector gear having a lower sector gear 57 and an upper sector gear 59 joined by the phaser gear hub 56 such that the lower and upper sector gears 57, 59 are rotated at the same speed by the phaser drive gear 37. In the example shown, the phaser drive gear 37 engages and drives the lower sector gear 57 of the phaser gear 39.

The upper sector gear 59 of the phaser gear 39 is shown in FIGS. 2 and 10 and is engaged with a plurality of pad gears 49 as shown in FIG. 11. Each of the plurality of pad gears 49 is attached to a pad gear shaft 50 of a rotation pad 11, as shown in FIGS. 6 and 7. Each rotation pad 11 is rotatably mounted to the turret 12, via the turret plate 76 and the turret frame 77, and the rotation pads 11 are distributed radially around the turret 12 such that as the turret 12 is indexed about the central axis 100 at an indexing rotation rate determined by rotation of the turret gear 108, each of the rotation pads 11 is progressed from one index station 15 to the next immediately adjacent index station 15. The plurality of pad gears 49 are concurrently rotatable by the phaser gear 39 such that each of the rotation pads 11 can be rotated about its pad axis 13 at the same pad rotation rate and concurrent with the rotation of each of the other rotation pads 11, where the pad rotation rate of each of the rotation pads 11 is the same and is determined by the rotation speed of the phaser gear 39. As shown in FIGS. 6 and 7, each rotation pad 11 includes a clutch assembly 54 configured to selectively engage the pad gear shaft 50 to rotate the rotation pad 11 by rotation of the pad gear 49. The clutch assembly 54 in the example shown includes an adjustable clutch 53, such that the clutch 53 force FC exerted by the clutch 53 on the pad gear shaft 50 is adjustable and variable. The clutch assembly 54 may include a clutch adjustment 73 for adjusting the clutch 53 force. In the example shown, the clutch 53 may be a magnetic clutch 53.

The clutch assembly 54 includes a clutch 53, a clutch housing 112 and a roller assembly 43. The clutch housing 112 is configured to receive a spindle 29 which is fixedly attached to the clutch housing 112 such that the spindle 29 is rotated with the pad gear shaft 50 when the clutch 53 is engaged and the rotation pad 11 is unlocked, e.g., when gripper mechanism 27 is actuated to release the gripper arms 109 from the grip faces 30 of the spindle 29 thereby allowing the pad gear shaft 50 to be driven by the clutch 53. The clutch housing 112 is mounted to the turret frame 77 of the turret 12 via a lower bearing assembly 74 and clutch bushing 75, and the spindle 29 is mounted to the turret plate 76 of the turret 12 via an upper bearing assembly 114 such that the rotation pad 11 is rotatable relative to the turret plate 76 and turret frame 77. The gripper mechanism 27 is attached to the turret frame 77 proximate the rotation pad 11 such that a gripping interface 51 of a gripper 28 included in the gripper mechanism 27 can grip the grip faces 30 defined by the spindle 29 when the gripper mechanism 27 is actuated, as shown in FIG. 13. The grip faces 30 are defined by a spindle element 94, which in the current example defines a generally square transverse cross-section and a plurality of generally rectangular grip faces 30, as shown in FIGS. 6, 13 and 23. The spindle element 94 may be integral to the spindle 29, or may be a separate element fixedly attached to the spindle 29 such that the spindle element 94 is not rotatable relative to the spindle 29. The spindle element 94, by way of a non-limiting example, may be a substantially square or rectangular block defining a central opening to receive the spindle 29, where the block is retained to the spindle 29 by press-fitting, welding, soldering or other suitable means to affix the block to the spindle 29 such that the block is not rotatable relative to the spindle 29 by gripping forces FG exerted on the spindle element 94 by the gripper 28. The example of a substantially square spindle element 94 is not limiting, and other configurations of a spindle element 94 may be used. For example, the spindle element 94 may be configured with a transverse cross-section defined by a regular polygon, such as a pentagon, hexagon, or the like, and such that the longitudinal faces of the polygon define the grip faces 30 of the spindle element 94.

Figure 14:
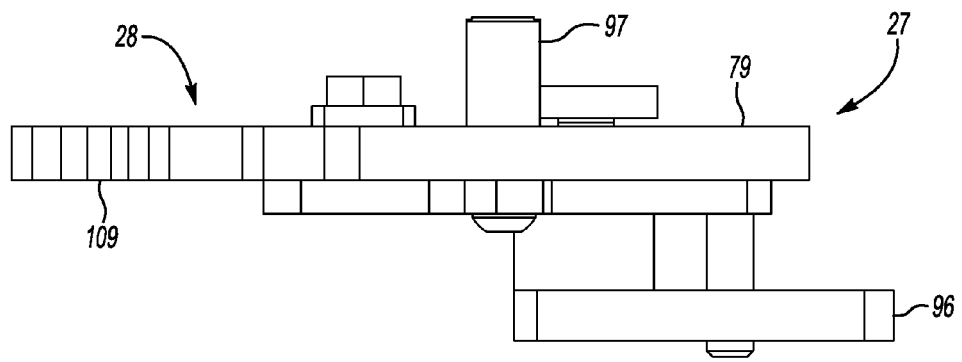
FIG. 14 is a schematic side view of the gripper mechanism of section 14-14 of FIG. 13.

Referring now to FIGS. 7, 13 and 14, the gripper mechanism 27 includes a gripper 28 including opposing gripper arms 109 each defining a gripping interface 51. As shown in FIG. 13, the gripping interface 51 may include a curved interface portion 52 and a flat interface portion 95, such that the gripping interface 51 is irregular to the grip faces 30 of the spindle element 94, e.g., such that the gripping interface 51 do not fully conform to the grip faces 30. The gripper 28 is actuable by movement of a locking element 97, which is moveable relative to the gripper arms 109 to cause the gripper arms 109 and gripping interfaces 51 to move away from each other in response to a spring force exerted by the gripper 28. The locking element 97 may be moved axially and/or may have an elongated or cam shape and be rotatable such that rotation of the locking element 97 by rotation of the locking lever 96 attached to the locking element 97 reduces the distance between the arm ends 79 causing the gripper arms 109 to open away from the grip faces 30 of the spindle 29 to release the spindle 29 for rotation, or in turn increases the distance between the arm ends 79 causing the gripper arms 109 to close toward each other such that the gripping interfaces 51 exert a gripping force FG on the grip faces 30 of the spindle element 94, where the gripping force FG opposes the clutch force FC and thus prevents rotation of the spindle 29 and the rotation pad 11 via the clutch 53 and pad gear 49 driven by the phaser gear 39. The locking element 97 is rotated by rotation of the locking lever 96 between a locked and unlocked position. In the locked position, the gripper 28 and gripper mechanism 27 is configured to exert a sufficient gripping force FG on the spindle 29 to overcome the clutch 53 force FC exerted by the clutch 53 on the pad gear shaft 50, to stop and prevent further rotation of the rotation pad 11 while the gripper 28 is in a locked condition.

The gripper mechanism 27 is locked by a gripper locking mechanism 91 shown in FIGS. 3 and 11. The gripper locking mechanism 91 is located adjacent the locking station 18, which is located between the discharge station 17 and the infeed station on the turret 12. The gripper locking mechanism 91 may be mounted to the base plate 70 such that as the turret 12 is indexed, the gripper locking mechanism 91 engages the locking lever 96 and repositions the locking lever 96 to the locked position, causing the locking lever 96 to move the locking element 97 to lock the gripper arms 109 against the grip faces 30 of the spindle element 94. The gripper 28 of each gripper mechanism 27 of each rotation pad 11 is locked when the rotation pad 11 is indexed by the turret 12 to the locking station 18, such that the rotation pad 11 is always locked and non-rotatable when presented to the infeed station to receive an object from the infeed member 26, e.g., from the infeed star wheel 26. As shown in FIG. 11, the rotation pad 11 in the locking station 18, and also in the discharge and receiving stations 17, 16, is not rotating because of contact between the rollers 44 of the rotation pad 11 and the roller guide 31. As such, the gripper locking mechanism 91 locks the gripper 28 to the spindle element 94 when the spindle element 94 is not rotating, e.g., when the spindle 29 is constrained from rotating by the rollers 44 in contact with the roller guide 31, and such that the gripping interface 51 can grip the spindle element 94 when the spindle element 94 is fixed, preventing wear on the gripping interfaces 51 and the grip faces 30 of spindle element 94 by preventing moving contact between the interface and the grip faces 30.

Figures 15, 16:
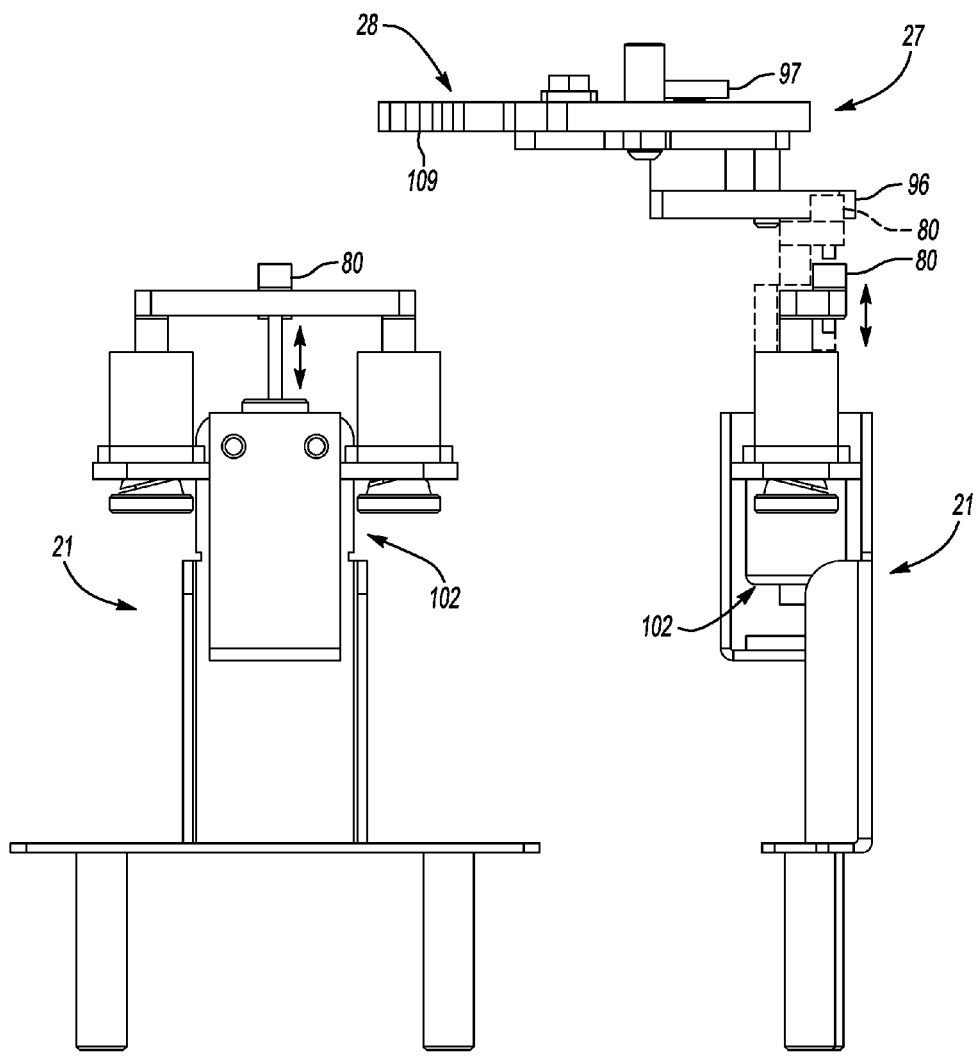
FIG. 15 is a schematic partial side view of section 15-15 of FIG. 11 showing the actuating assembly.
FIG. 16 is a schematic side view of the actuating assembly of FIG. 15 and the gripper mechanism of FIG. 14, showing the actuator in an actuated position in phantom.

Referring now to FIGS. 11, 15, and 16, an actuator mechanism 21 is shown. The actuator mechanism 21 is operable to actuate the gripper mechanism 27 to unlock the gripper 28. In the example shown, the actuator mechanism 21 includes a linear actuator 102 configured to selectively extend an actuating element 80 upward (as shown in the figures) such that the actuating element 80 in the extended (upward) position interferes with the locking lever 96 as the rotation pad 11 and associated gripper mechanism 27 are indexed past the actuator mechanism 21, and such that the extended actuating element 80 exerts a resisting force on the locking lever 96 causing the locking lever 96 to rotate away from the actuating element 80 to an unlocked position, thereby releasing the gripper 28 from the spindle element 94 and unlocking the spindle 29 to allow rotation of the rotation pad 11 by the pad gear 49 and pad gear shaft 50 via the clutch 53 engaged to the pad gear shaft 50. The linear actuator 102 may include a solenoid (not shown) for extending the actuating element 80. The actuator mechanism 21 and/or the linear actuator 102 is configured to receive an actuation signal generated by the sensing device 25, and to actuate (extend) the actuating element 80 in response to the actuation signal. The sensing device 25 and/or actuator mechanism 21 may include other elements not shown to control and/or coordinate actuation of the actuator mechanism 21 with indexing of the turret 12 and operation of the sensing device 25, where such other elements may include, by way of non-limiting example, switches, timers, controllers, etc. The example of a linear actuator 102 including a solenoid is non-limiting, and other actuation triggers may be used, including pneumatic actuators. The solenoid actuator 102 is advantaged as compared to pneumatic actuators, having relatively better precision and repeatability in actuation response, and is advantaged by not requiring a pneumatic input or pneumatic equipment to trigger the pneumatic actuator, and by not incurring the operating variability which may be associated with a pneumatic system, for example, due to variability in line pressure, etc.

Referring now to FIGS. 1-3, in the non-limiting example shown the rotary orienter 10 includes a feed conveyor system 81 for infeed and discharge of objects from the rotary orienter 10. The feed conveyor system 81 includes an infeed conveyor 22 and a discharge conveyor 23 which may be separate conveyors 22, 23, or as shown in the example may be sections of a continuous feed conveyor 24. A timing screw assembly 82 may be positioned proximate the infeed conveyor 22 and may include a timing screw 83, also referred to as a feed screw, rotatable by a timing screw drive assembly 84 and operable to feed objects at a spacing interval defined by the timing screw 83. A syncro bar 85 is operatively connected to the turret gear 108 via the infeed star wheel gear shaft 90 and to the timing screw drive assembly 84 and is operable to rotate the timing screw 83 at a timing screw rotation rate determined by the turret gear 108, such that rotation of the timing screw 83 is coordinated with indexing of the turret 12 and rotation of the infeed star wheel 26. Objects are fed in random orientation by the infeed screw drive to the infeed star wheel 26 and are positioned on a rotation pad 11 at the receiving station 16 for reorientation of the placed object from the received orientation to the predetermined orientation, as previously described herein. The object in the predetermined orientation is discharged from the rotation pad 11 upon indexing of the rotation pad 11 to the discharge station 17, where the object is removed from the rotation pad 11 by the discharge member 87, e.g., the discharge star wheel 87, to the discharge conveyor 23, with the object in the predetermined orientation as it is removed from the rotation pad 11. The discharge star wheel 87 is driven by a discharge star wheel gear shaft 89 which is rotatably connected to a discharge star wheel gear 88 engaged with the turret gear 108 as shown in FIGS. 1-3 and 8, such that rotation of the discharge star wheel 87 is coordinated with indexing of the turret 12 by the turret gear 108.

The above features and other features and advantages of the present disclosure are readily apparent from the detailed description of the best modes for carrying out the disclosure described herein, when taken in connection with the accompanying drawings. The detailed description and the drawings or figures are supportive and descriptive of the disclosure, but the scope of the invention is defined solely by the claims. While some of the best modes and other embodiments for carrying out the claimed invention have been described in detail, various alternative designs and embodiments exist for practicing the invention defined in the appended claims.

What is claimed is:
1. A rotary orienter comprising:
a central shaft defining a central axis;
a turret rotatably attached to the central shaft and rotatable about the central axis;
a rotation pad defining a pad axis and rotatably mounted to the turret such that the rotation pad is selectively rotatable about the pad axis;
wherein:
the turret is rotatable to index the rotation pad to a plurality of index stations including a receiving station, a discharge station, and an actuating station distributed radially about the turret;

the actuating station is intermediate the receiving station and the discharge station;
the rotation pad is lockable such that the locked rotation pad is prevented from rotating;
the rotation pad is locked prior to being indexed from the receiving station;
the actuating station includes an actuator mechanism actuable to selectively unlock the rotation pad at the actuating station;
unlocking the rotation pad initiates rotation of the rotation pad;
wherein the unlocked rotation pad is rotatable about the pad axis concurrent with indexing of the turret about the central axis; and
a roller guide adjacent the discharge station;
a plurality of contact rollers attached to the rotation pad; and
wherein at least one of the contact rollers contacts the roller guide to prevent rotation of the rotation pad in the discharge station.

2. The rotary orientor of claim 1, wherein:
the turret is rotatable at an indexing rotation rate about the central axis;
the rotation pad is rotatable about the pad axis at a pad rotation rate; and
the pad rotation rate is independently adjustable relative to the indexing rotation rate.

3. The rotary orientor of claim 2, wherein the indexing rotation rate is less than the pad rotation rate.

4. The rotary orientor of claim 1, wherein the plurality of contact rollers includes a first roller and a second roller arranged such that the first roller contacts the roller guide prior to the second roller contacting the roller guide to gradually slow rotation of the rotation pad when the rotation pad is unlocked when indexed to the discharge station.

5. The rotary orientor of claim 1, further comprising:
the roller guide adjacent the receiving station;
wherein the contact rollers contact the roller guide to prevent rotation of the rotation pad in the receiving station.

6. The rotary orientor of claim 1, further comprising:
a gripping mechanism operably attached to the rotation pad;
wherein the gripping mechanism is selectively lockable to prevent rotation of the rotation pad;
a locking station intermediate the discharge station and the receiving station;
wherein the locking station is operable to lock the gripping mechanism such that the rotation pad is locked prior to being indexed to the receiving station.

7. The rotary orientor of claim 6, wherein:
the gripping mechanism is selectively actuable by the actuation station to unlock the rotation pad.

8. The rotary orientor of claim 6, further comprising:
the rotation pad including a spindle defining the pad axis;
wherein the spindle defines a grip face;
wherein the gripping mechanism is selectively lockable to the grip face to exert a gripping force on the spindle; and
wherein the gripping force is sufficient to lock the rotation pad such that rotation of the rotation pad is prevented.

9. The rotary orientor of claim 8, further comprising:
the rotation pad including a clutch operable to exert a clutch force on the spindle to rotate the rotation pad;
wherein the gripping force is sufficient to overcome the clutch force to prevent rotation of the rotation pad by the clutch.

10. The rotary orientor of claim 9, wherein the clutch is adjustable to balance the clutch force to the gripping force.

11. The rotary orientor of claim 8, further comprising:
the gripping mechanism including opposing gripper arms which are lockable on the grip face to exert the gripping force;
wherein the gripper arms define a gripping interface which is contoured such that the gripping interface is irregular to the grip face of the spindle.

12. A rotary orientor comprising:
a central shaft defining a central axis;
a turret rotatably attached to the central shaft and rotatable about the central axis;
a rotation pad defining a pad axis and rotatably mounted to the turret such that the rotation pad is selectively rotatable about the pad axis;
wherein:
the turret is rotatable to index the rotation pad to a plurality of index stations including a receiving station, a discharge station, and an actuating station distributed radially about the turret;
the actuating station is intermediate the receiving station and the discharge station;
the rotation pad is lockable such that the locked rotation pad is prevented from rotating;
the rotation pad is locked prior to being indexed from the receiving station;
the actuating station includes an actuator mechanism actuable to selectively unlock the rotation pad at the actuating station;
unlocking the rotation pad initiates rotation of the rotation pad; and
wherein the unlocked rotation pad is rotatable about the pad axis concurrent with indexing of the turret about the central axis; and
a sensor to sense a received orientation of an object received on the rotation pad at the receiving station;
the sensor operable to selectively output an actuating signal to the actuator mechanism to unlock the rotation pad to initiate rotation of the rotation pad at the actuating station when the received orientation of the object is different from a predetermined orientation of the object.

13. The rotary orientor of claim 12, wherein:
the sensor is operable to sense an orienting feature defined by the object; and
the predetermined orientation of the object is defined by the orienting feature.

14. The rotary orientor of claim 12, wherein the rotation pad is rotatable at a pad rotation rate such that the object is reoriented from the received orientation to the predetermined orientation by rotation of the rotation pad during indexing of the rotation pad by the turret from the actuating station to the discharge station.

15. The rotary orientor of claim 14, wherein the actuating station is a first actuating station including a first actuator mechanism, the rotary orientor further comprising:
a second actuating station intermediate the first actuating station and the discharge station;
wherein the second actuating station includes a second actuator mechanism;
wherein the sensor is operable to selectively output the actuating signal to each of the first and second actuator mechanisms;

wherein whether the sensor outputs the actuating signal to one of the first and second actuator mechanism is determined by the received orientation of the object sensed by the sensor.

16. A method of orienting an object using a rotary orientor, the method comprising:
    locking a rotation pad at a locking station of a turret such that the rotation pad when locked is not rotatable about a pad axis defined by the rotation pad;
    rotating the turret about a central axis defined by the turret to index the locked rotation pad from the locking station to a receiving station;
    receiving an object in a received orientation on the rotation pad positioned at the receiving station;
    wherein:
        the rotation pad is rotatably mounted to the turret such that the rotation pad is rotatable about the pad axis when unlocked and prevented from rotating about the pad axis when locked;
        the turret is rotatably attached to a central shaft defining the central axis;
        the turret is rotatable about the central axis to continuously index the rotation pad through a plurality of index stations including, sequentially, the locking station, the receiving station, an actuating station, and a discharge station distributed radially about the turret;
        the actuating station includes an actuator mechanism actuable to selectively unlock the rotation pad to initiate rotation of the rotation pad at the actuating station; and
        the unlocked rotation pad rotates about the pad axis concurrent with indexing of the turret about the central axis;
    sensing the received orientation of the object using a sensor;
    outputting an actuating signal from the sensor when the received orientation of the object is different from a predetermined orientation;
    receiving the actuating signal at the actuator mechanism;
    indexing the rotation pad to the actuating station;
    actuating the actuator mechanism to unlock the rotation pad when the rotation pad is indexed to the actuating station;
    wherein unlocking the rotation pad initiates rotation of the rotation pad;
    rotating the rotation pad about the pad axis while concurrently indexing the rotation pad to the discharge station such that the object is reoriented to the predetermined orientation when the rotation pad is indexed to the discharge station; and
    discharging the object in the predetermined orientation from the rotation pad positioned at the discharge station.

17. The method of claim 16, further comprising:
    gradually stopping rotation of the rotation pad when the rotation pad is unlocked and indexed in contact with a roller guide adjacent the discharge station;
    wherein the rotation pad includes a roller assembly including a first contact roller and a second contact roller; and
    wherein gradually slowing rotation of the rotation pad comprises:
        the first contact roller contacting the roller guide prior to the second contact roller contacting the roller guide; and
        stopping rotation of the rotation pad when both the first and second contact rollers are in contact with the roller guide.

18. The method of claim 16, wherein:
    the actuating station is a first actuating station;
    the received orientation is one of a first received orientation and a second received orientation;
    the method further comprising:
    outputting the actuating signal to one of the first actuating station and a second actuating station;
    wherein the second actuating station is disposed intermediate the first actuating station and the discharge station; and
    wherein the actuating signal is output to the one of the first and second actuating stations.

19. The method of claim 16, further comprising:
    feeding the object to the rotation pad positioned at the receiving station using an infeed member;
    discharging the object from the rotation pad positioned at the discharge station to a discharge member such that the discharged object is received by the discharge member in the predetermined orientation.

* * * * *